US008145212B2

(12) United States Patent
Lopresti et al.

(10) Patent No.: US 8,145,212 B2
(45) Date of Patent: Mar. 27, 2012

(54) WIRELESS DEVICE ACTIVATION

(75) Inventors: Alejandro Lopresti, Alpharetta, GA (US); David Thorn, London (GB); Stephen Parsons, Bath (GB)

(73) Assignee: Evolving Systems, Inc., Englewood, CO (US)

( * ) Notice: Subject to any disclaimer, the term of this patent is extended or adjusted under 35 U.S.C. 154(b) by 879 days.

(21) Appl. No.: 12/197,396

(22) Filed: Aug. 25, 2008

(65) Prior Publication Data
US 2009/0149175 A1 Jun. 11, 2009

Related U.S. Application Data

(60) Provisional application No. 60/992,913, filed on Dec. 6, 2007.

(51) Int. Cl.
*H04W 4/00* (2009.01)
(52) U.S. Cl. ............ 455/433; 455/432.2; 455/435.1; 455/435.3; 455/411; 455/558; 370/241; 370/248
(58) Field of Classification Search ........... 455/432.2, 455/435.1, 435.2, 435.3, 411, 433, 558; 380/241, 380/248
See application file for complete search history.

(56) References Cited

U.S. PATENT DOCUMENTS

| | | | |
|---|---|---|---|
| 5,887,253 A * | 3/1999 | O'Neil et al. ................. 455/418 |
| 6,014,561 A | 1/2000 | Mölne | |
| 6,167,251 A | 12/2000 | Segal et al. | |
| 6,591,098 B1 * | 7/2003 | Shieh et al. ................... 455/419 |
| 6,680,601 B2 | 1/2004 | Wallgren | |
| 6,836,651 B2 | 12/2004 | Segal et al. | |
| 7,197,301 B2 | 3/2007 | Netanel | |
| 7,274,928 B2 | 9/2007 | Netanel et al. | |
| 7,444,148 B1 | 10/2008 | Cook | |
| 2001/0029182 A1 * | 10/2001 | McCann et al. ............... 455/433 |
| 2002/0094808 A1 | 7/2002 | Tiedemann, Jr. et al. | |
| 2003/0031305 A1 | 2/2003 | Netanel et al. | |
| 2003/0119490 A1 | 6/2003 | Mohammed | |
| 2003/0166398 A1 | 9/2003 | Netanel | |
| 2005/0020234 A1 | 1/2005 | Iivari et al. | |
| 2005/0181793 A1 * | 8/2005 | Netanel ...................... 455/435.2 |
| 2006/0035631 A1 | 2/2006 | White et al. | |
| 2006/0143098 A1 * | 6/2006 | Lazaridis ........................ 705/34 |

(Continued)

FOREIGN PATENT DOCUMENTS

EP 1703760 A2 9/2006

(Continued)

OTHER PUBLICATIONS

Patent Cooperation Treaty (RO/US), International Search Report of the International Search Authority mailed Nov. 30, 2010, 3 pages, PCT/US2010/032200 filed Apr. 23, 2010.

(Continued)

*Primary Examiner* — Kamran Afshar
*Assistant Examiner* — Kathy Wang-Hurst
(74) *Attorney, Agent, or Firm* — Kilpatrick Townsend & Stockton LLP

(57) ABSTRACT

Tools and techniques for activating a wireless device on a wireless network. In an aspect, such tools can allow an unactivated wireless device (that is, a wireless device that generally would be inoperable on a wireless network) to be given limited functionality in order to activate itself on the network. In some cases, such tools can be implemented within business processes to generate revenue streams for entities involved in the wireless activation process.

40 Claims, 9 Drawing Sheets

U.S. PATENT DOCUMENTS

| | | |
|---|---|---|
| 2006/0205434 A1* | 9/2006 | Tom et al. ............... 455/558 |
| 2007/0300294 A1 | 12/2007 | Netanel et al. |
| 2008/0026740 A1 | 1/2008 | Netanel |
| 2008/0057935 A1 | 3/2008 | Netanel et al. |
| 2009/0011759 A1* | 1/2009 | Alperovich et al. ......... 455/433 |
| 2009/0025070 A1 | 1/2009 | Netanel et al. |
| 2010/0273462 A1* | 10/2010 | Thorn et al. ............... 455/414.1 |

FOREIGN PATENT DOCUMENTS

| | | |
|---|---|---|
| WO | WO 00/21275 A1 | 4/2000 |
| WO | WO 01/60092 A3 | 8/2001 |
| WO | WO 02/058361 A2 | 7/2002 |
| WO | WO 02/058361 A3 | 7/2002 |
| WO | WO 2008/118638 A1 | 10/2008 |

OTHER PUBLICATIONS

International Search Report and Written Opinion of PCT/US2008/082484 mailed on Jan. 7, 2009, 9 pages.

* cited by examiner

WIRELESS DEVICE ACTIVATION

CROSS-REFERENCE TO RELATED APPLICATIONS

This application claims the benefit, under 35 U.S.C. §119 (e), of the filing date of provisional U.S. Patent Application No. 60/992,913, filed Dec. 6, 2007 by Lopresti et al. and entitled "Wireless Device Activation," the entire disclosure of which is hereby incorporated by reference.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD OF THE INVENTION

The present invention relates, in general, to wireless telephone networks, and more particularly, to tools for provisioning and/or activating wireless devices on such networks.

BACKGROUND

In order to operate on a wireless network, a wireless device (which can include, but is not limited to a wireless phone) generally must be a subscriber on the network, neglecting for cases in which a wireless devices operates in a roaming mode on a foreign network. To identify the device to the network as a subscriber, a wireless provider generally undertakes a practice referred to herein as "activation," in which the phone is identified to the network using an identifier (such as an international mobile subscriber identifier ("IMSI") or similar identifying number, which, in many cases, is encoded on a subscriber identity module "SIM"in the wireless device). In a general sense, this process involves creating, in a home location register ("HLR"), a record for the device; in some cases, the record comprises the identifying number, as well as an addressing number (e.g., a phone number for a wireless phone), such as an international ISDN number ("MSISDN") or similar number. This record identifies the device to the network and provides information about the capabilities of the device. Without such a record in an HLR, the device generally will be inoperable on the wireless network.

Hence, when a user purchases a new wireless device, the user's wireless provider generally must activate the device before the user can use the device on the provider's network. There are, in general, three different ways in which a wireless device can be activated.

In the first case, the wireless device is preactivated prior to sale of the device to the user. This process is used most frequently for prepaid wireless phones. Under a preactivation scheme, the device has installed therein a SIM that is assigned an activated IMSI before the device ever is sold. This technique, while technically feasible, has several downsides. First, because the IMSI is assigned and activated before the device is sold, there is enhanced risk of theft and other supply-chain "leakage." Second, this technique requires substantial investment in allocating and activating IMSIs early in the supply chain, resulting in inefficiencies (for example, maintain a relatively large stock of activated IMSIs corresponding to devices that may not be sold or used for some time). Moreover, if the supply chain involves rebranding the devices, some of the allocated and activated IMSIs might never be used. Moreover, preactivation of a SIM generally requires the assignment of an MSISDN to the SIM (by associating the MSISDN with the IMSI assigned to the SIM). Given that IMSIs (and, especially, MSISDNs) can be relatively scarce resources, this solution is less than optimal.

In the second case, the wireless device is activated at the point of sale. While this technique is suitable for applications in which the device is sold at a relatively sophisticated reseller or agent of the wireless provider, it is unavailable in many cases (including, for example, in the case of prepaid phones or phones that are purchased at locations other than dedicated resellers).

The third option is to sell a wireless device in an unactivated state and require the user to activate the phone before using it. Because, as noted above, the device is inoperable on the network until activation, the device itself cannot be used as the activation vehicle. Hence, the user will have to call the provider (using a different phone), visit the provider's website (using a separate computer or some other device), and/or the like. This option, while sometimes the only available option, is less than desirable because it imposes an inconvenience on the user, resulting in a competitive disadvantage for the provider in relation to techniques that do not impose this inconvenience on the user.

Moreover, existing techniques for activating wireless devices offer the user limited (if any) input into the phone number (e.g., MSISDN) that the device will be assigned.

Accordingly, there is a need for more robust techniques for activating wireless devices on wireless networks.

BRIEF SUMMARY

In one aspect, embodiments of the invention provide tools and techniques that can be used to activate a wireless device on a wireless network. In another aspect, embodiments of the invention provide business processes that employ these tools and techniques to generate revenue streams for entities involved in the wireless activation process. Beneficially, in accordance with some embodiments of the invention, a unactivated wireless device (that is, a wireless device that generally would be inoperable on a wireless network) can be given limited functionality in order to activate itself on the network.

Merely by way of example, in a set of embodiments, a wireless device (or, more specifically, in some cases a SIM card installed in a wireless device) is assigned a temporary IMSI number, which is part of a pool of known temporary IMSI numbers. In such embodiments, a specialized detection device is provided in the wireless network, and the network is configured to recognize the detection device as the HLR for each IMSI number in the pool of known temporary IMSI numbers. Hence, in an aspect, when the device attempts to register on the network (e.g., when initially powered on in the presence of the network), the network will query the detection device for data pertaining to the phone.

In an embodiment, however, rather than serving as a conventional HLR, the detection device will recognize the temporary IMSI and notify an activation system that the wireless device is attempting to activate on the network. The activation system, then, might take actions to activate the phone on the network. Merely by way of example, the activation system might assign a permanent addressing number (e.g., MSISDN) to the device and/or update a traditional HLR with relevant data about the wireless device, effectively activating the device on the network. Thereafter, the wireless device can be used in conventional fashion on the network. The activation system might assign a permanent IMSI number to the phone and/or optionally recycle the temporary IMSI number, so that it can be used for a future activation of another wireless device.

In one set of embodiments, the selection of the permanent addressing number is based on input from the user. Merely by way of example, the user might be given the option to either accept a default number, select from a list of possible numbers, or request a number with specific characteristics. In some cases, the tools of the invention can be configured to charge the user a fee for such flexibility; in an aspect the fee can vary according to the level of number customization the user desires. Merely by way of the example, if the user elects to accept a default number, the user might be charged no fee for the selection, while if the user elects to select a number from a provided list, the user will be charged a first fee, and if the user elects to request a number with specified characteristics (e.g., a number containing some desired sequence of numbers), the user might be charged a second fee. Moreover, the user might be allowed to select a premium or "golden" number (i.e., a highly desirable number) for an additional fee. Any of such fees can be either one-time fees or fees that recur periodically (e.g., on a monthly statement, etc.). Such fees can be applied against the user's wireless account and/or charged separately.

The tools provided by various embodiments of the invention include, without limitation, methods, systems, and/or software products. Mainly by way of example, a method might comprise one or more procedures, any or all of which are executed by a computer system. Correspondingly, an embodiment might comprise a computer system configured with instructions to perform one or more procedures in accordance with methods of the invention. Similarly, a computer program might comprise a set of instructions that are executable by a computer system (and/or a processor therein) to perform such operations. In many cases, such software programs are encoded on physical and/or tangible computer readable media (such as, merely by way of example, optical media, magnetic media, and/or the like).

Merely by way of example, a method of activating a wireless device in accordance with one set of embodiments comprises assigning a first identification number to the wireless device. In an aspect, the identification number falls within a pool of known identification numbers; in another aspect, the wireless device is not activated as a subscriber on the wireless network. The method might further comprise providing, in the wireless network, a detection device configured to identify the wireless device, and/or configuring the wireless network to identify the detection device as a quasi-home location register for the block of known identification numbers.

In some embodiments, the method comprises receiving, (e.g., at a base station controller) a message from the wireless device; the message might comprise the first identification number, and/or the first identification number might be identifiable from the message. The method, then, may include identifying the first identification number, based on the message from the wireless device. Based on the identification of the first identification number, the detection device may be queried for data pertaining to the wireless device.

When a query (e.g., from a component of the wireless network, such as a mobile switching center, visited location register, etc.) for data pertaining to the wireless device is received at the detection device, a temporary addressing number may be assigned to the wireless device. The method may also comprise, in response to the query, providing, to the component of the wireless network, the temporary addressing number.

In an aspect, the method comprises notifying an activation system that the wireless device has been detected and/or assigning, at the activation system, a permanent addressing number to the wireless device. The method may further include creating a record in a home location register corresponding to the wireless device; in another aspect, the record comprises the permanent addressing number.

Another method of activating a wireless device might comprise maintaining, at an activation system, a pool of temporary IMSI numbers and/or providing the pool of temporary IMSI numbers to a SIM manufacturing process. In an aspect, the method further comprises detecting, in a wireless network, an attempt to register by a wireless device corresponding to one of the temporary IMSI numbers. Based upon detecting the attempt to register, the method can include assigning a MSISDN to the wireless device and/or a permanent IMSI number to the wireless device. The method may further include updating the wireless device with the assigned MSISDN and/or permanent IMSI number.

A system in accordance with another set of embodiments comprises an activation system, which can include, without limitation, a processor and a first computer readable medium. The first computer readable medium having encoded thereon a first set of instructions executable by the first activation system to perform one or more operations. Merely by way of example, in an aspect, the first set of instructions comprises instructions for maintaining a pool of known identification numbers for wireless devices; and instructions for providing a temporary identification number for use in a wireless device. The first identification number, in an aspect, falls within the pool of known identification numbers.

The system might also comprise a detection device in a wireless network. The detection device, in an embodiment, comprises a second processor and a second computer readable medium having encoded thereon a second set of instructions executable by the detection device to perform one or more operations. Merely by way of example, the second set of instructions might comprise instructions for receiving, from a component of the wireless network, a query for data pertaining to the wireless device. Because, in an aspect, the wireless device is not a subscriber on the wireless network, the second set of instructions might comprise further instructions for assigning a temporary addressing number to the wireless device and/or for providing, to the component of the wireless network, the temporary addressing number, in response to the query.

The detection device may also include instructions for notifying the activation system that the mobile device has been detected. The activation system may also include instructions to assign a permanent addressing number to the wireless device, and/or instructions to create, in a home location register, a record corresponding to the wireless device, wherein the record comprises the permanent addressing number.

An apparatus in accordance with yet another set of embodiments comprises a first computer readable medium, having encoded thereon a first set of instructions executable by an activation system to perform one or more operations, and/or a second computer readable medium having encoded thereon a second set of instructions executable by a detection device in a wireless network to perform one or more operations. Merely by way of example, the first and second sets of instructions may include, respectively, the instructions described above.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral to denote one of multiple similar components. When reference is made to a reference numeral without specification to an existing sublabel, it is intended to refer to all such multiple similar components.

DETAILED DESCRIPTION

Figure 1:
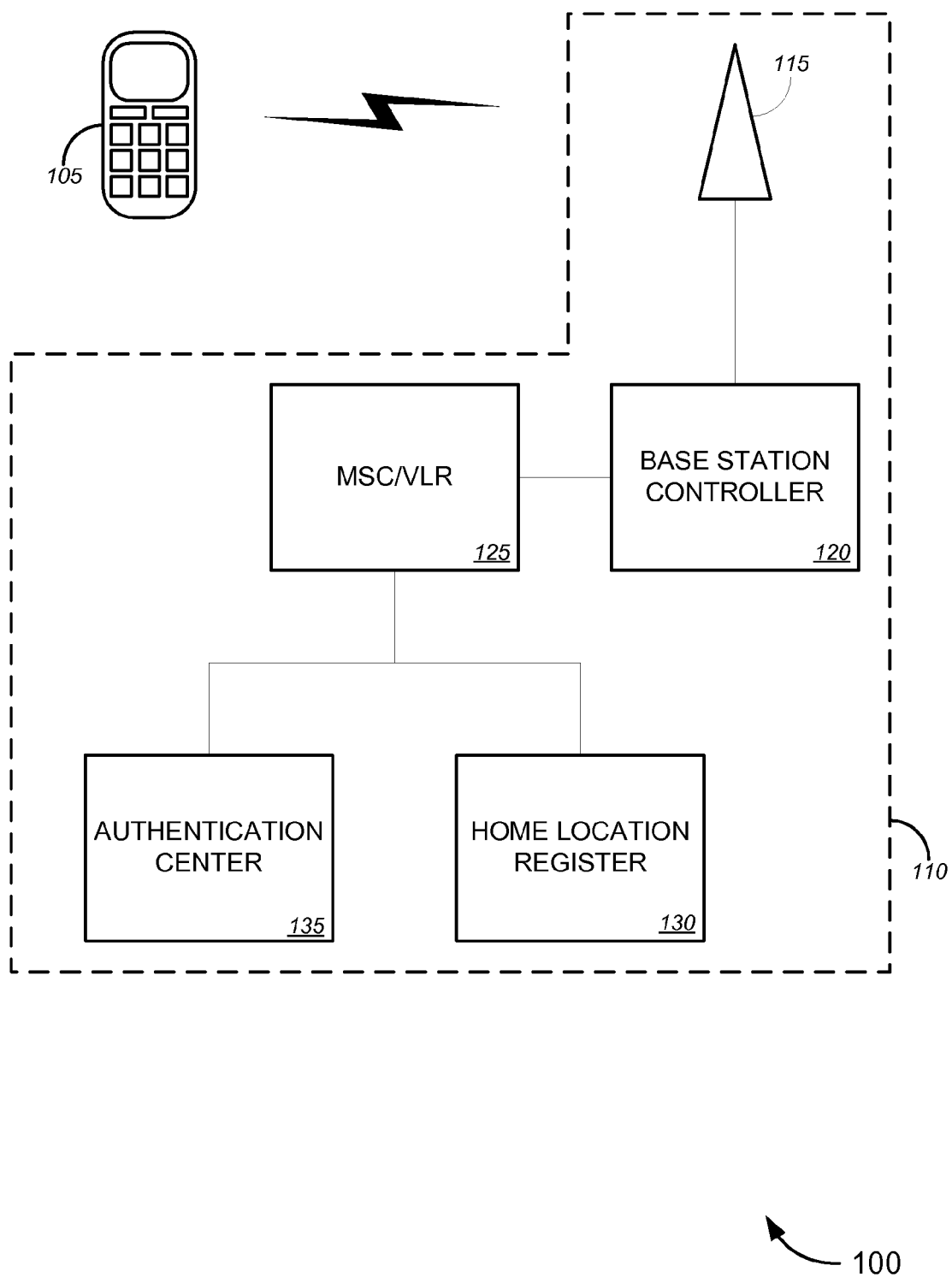
FIG. 1 is a block diagram illustrating a typical relationship between a wireless device and a wireless network.

While aspects of various embodiments have been summarized above, the following detailed description illustrates exemplary embodiments in further detail to enable one of skill in the art to practice these exemplary embodiments. In the following description, for the purposes of explanation, numerous specific details are set forth in order to provide a thorough understanding of features in accordance with various embodiments. It will be apparent, however, to one skilled in the art that other embodiments of the present invention may be practiced without some of these specific details. In other instances, well-known structures and devices are shown in block diagram form. Several embodiments are described below, and while various features are ascribed to different embodiments, it should be appreciated that the features described with respect to one embodiment may be incorporated with another embodiments as well. By the same token, however, no single feature or features of any described embodiment should be considered essential, as other embodiments of the invention may omit such features.

Overview

In an aspect, some embodiments provide tools to allow a wireless device to act as the vehicle for its own activation in a wireless network. As used herein, the term "wireless device" is used to mean any type of device that operates by access to a wireless network and requires activation to be operable. Such devices include wireless phones, as well as connected personal digital assistants, portable email devices, and/or the like. In one aspect, such devices may operate on what is sometimes referred to as a "wide area cellular" network, including without limitation a Global System for Mobile telecommunications ("GSM") network, a code division multiple access ("CDMA") network, and/or networks operating in accordance with any derivatives thereof (such as General Packet Radio Service ("GPRS"), Enhanced Data rates for GSM Evolution ("EDGE"), CDMA2000, Universal Mobile Telecommunications Standard ("UMTS"), Wideband-CDMA ("W-CDMA") High Speed Packet Access ("HPSA"), and Evolution-Data Optimized ("EVDO") technologies, among others).

Beneficially, certain embodiments may overcome many of the deficiencies of conventional wireless device activation techniques. Merely by way of example, an aspect of some embodiments enables a wireless provider to streamline its supply chain and allows more efficient of utilization wireless resources (including without limitation, network equipment, SIMs, MSISDNs, IMSI numbers, and the like) by foregoing the need to preallocate and/or preactivate IMSI numbers or MSISDNs at early points in the supply chain, instead allowing for IMSI/MSISDN allocation and/or activation after the purchase of the wireless device by the end user. Hence, some embodiments allow just-in-time provisioning of SIMs and/or numbers.

In various embodiments, the tools and techniques described herein can be used to activate devices under many difference scenarios. Merely by way of example, in some cases, the tools and techniques may be used to activate wireless devices in a prepaid environment (in which a user pays in advance for the use of the device on a wireless network) and/or in a postpaid environment (in which a user pays, typically on a periodic basis, for the use of the device over a preceding period, typically on a per-minute or flat-rate per month basis).

In another aspect, some embodiments provide an improved experience for the end user. Merely by way of example, in accordance with some embodiments, the user can purchase a phone (or other wireless device) at a convenient location (which need not be a dedicated wireless reseller with activation facilities) and yet forgo the traditional need to access a secondary telephone or computer to activate a device purchased under such circumstances. Additionally and/or alternatively, embodiments can, in some cases, allow a user to have a degree of input (which can vary by implementation and/or user preference) into the selection of the MSISDN assigned to the wireless device. In such cases, embodiments can include business processes that can be used to monetize the MSISDN selection process, for example, by charging a fee based on the type of number selection technique chosen by the user. Further, certain embodiments provide an activation process that prevents any error messages from frustrating the customer during the activation process and avoids the need to provide any of the user's personal information to the serving operator's network during the activation process.

In a beneficial aspect of some embodiments, these and other features may be provided though the manufacture of SIMs with temporary IMSI numbers in specified ranges. In a particular aspect, these IMSI numbers may not be associated with any subscriber information in the serving operator's network. Rather than routing communications from devices with these temporary IMSI numbers to core network equipment (such as HLRs, authentication centers, and/or the like), the serving operator's network may be configured to route these communications to a detection device that operates in accordance with method provided by various embodiments. The serving operator's network may also be configured to identify this detection device as a quasi-HLR for the specified range of temporary IMSI numbers. (It should be noted that this "range" of temporary IMSI numbers need not be a contiguous range—any appropriate technique may be used to identify these temporary IMSI numbers and/or distinguish them from "permanent" IMSI numbers that are used for conventional communications with a wireless device.)

In some embodiments, when a serving operator's network receives an initial registration message from a device assigned one of these temporary IMSI numbers, it then may forward this message to a detection device, which selects a temporary MSISDN number for the SIM and provides a profile for the wireless device to the serving operator's network (and/or more particularly, the appropriate equipment, such as a visited location register and/or visited mobile switching center). This profile, which contains the temporary MSISDN number, provides the wireless device with sufficient access to the serving operator's network to complete the activation process.

The detection device, in accordance with some embodiments, provides sufficient signaling support to allow the serving operator's network to register and manage the wireless device without causing any error to be displayed to the user of the wireless device, resulting in a more satisfying activation experience for the user. Merely by way of example, in some cases, the detection device may be configured to forward any authentication requests from the serving operator's network (and/or any devices therein) to an appropriate authentication center; in an aspect, however, the detection device may also operate to provision the security keys at the authentication center before forwarding the authentication request.

The detection device may also be configured to notify an activation system that a wireless device with a temporary IMSI has registered with the network. The activation system, then, may assign a permanent MSISDN to the wireless device (based, perhaps, on an interaction between the user and the activation system) and/or may assign a permanent IMSI number to the SIM card in the wireless device. The activation system may also create, in the serving operator's core network equipment (e.g., home location registers, authentication centers, etc.) appropriate records comprising the permanent MSISDN and IMSI number. The temporary MSISDN then may be returned to the pool for re-use by the detection device in another activation procedure.

EXAMPLES

FIG. 1 illustrates a typical arrangement 100 of a wireless device 105 (sometimes referred to herein as a "handset") and wireless network 110, which may include one or more of a wireless intelligent network ("WIN"), a signaling system 7 ("SS7") network, a public switched telephone network ("PSTN"), a data network (such as an Internet Protocol network, which can include the Internet, an Intranet, and/or the like). In the arrangement 100 of FIG. 1, the network 110 comprises (and/or provides communication between) a base station 115, a base station controller 120, a mobile switching center 125, a home location register 130, and an authentication center 135. (One skilled in the art will appreciate that the network 110 might include other components, such as a switching service point, intelligent peripheral, etc., and/or or that the network 110 often will comprise multiple base stations 115, base station controllers 120, mobile switching centers 135, home location registers 130 and/or authentication centers 135. Likewise, it is possible that two or more of these components might be integrated in a single device.)

Generally, the handset 105 has associated therewith an identification number (which may be, but need not necessarily be, an IMSI, and which may be, but need not necessarily be, stored on a SIM installed in the handset 105) that identifies the handset to the network, and/or an addressing number (which may be, but need not necessarily be, an MSISDN), which is used by the network 110 to address the handset 105 when communicating with the handset 105.

In normal operation, when an activated handset 105 registers with the network (e.g., is powered on, enters the service area, etc.), it sends a message, which is received at the base station controller 120 (usually via the base station 115). The message generally will include the identification number of the handset 105, either explicitly or implicitly (e.g., the base station controller 120 will be able to ascertain the identification number and associate it with the message, if necessary.) The MSC 125 (or some other component of the network 110) thus identifies the identification number of the handset 105 and queries the HLR 130, which returns to the MSC 125 data about the handset 105. (While this document, for ease of description, refers to communications between the MSC 125 and other devices, one skilled in the art will appreciate that, in practice, it is often either a visited location register ("VLR"), which, in many cases, is collocated with the MSC 125, the MSC 125 itself and/or some combination thereof, that participates in such communications. Hence, this document sometimes refers to the MSC and VLR collectively, and references herein to operations involving the MSC 125 should be considered to include operations that might involve a VLR as well.) Such data can include the addressing number of the handset 105, as well as the capabilities of the handset 105.

Typically, a security key is used to secure communications between the handset 105 and the network 110. This security key (often implemented as a set of data "triplets" comprising a signed response, session key and a random number) is generated by the authentication center 135, based on a shared secret stored in the handset (often referred to as "Ki") and in a record in the authentication center 135. In a typical implementation, the HLR 130 forwards the query (or at least the handset's identification number) to the authentication center 135 as well. The authentication center 135 correlates the handset's identification number with the shared secret, such that when provided the identification number, the authentication center 135 can generate the security key based on the shared secret for that handset and return it to the MSC 125, which can use that data to authenticate the handset 105.

Once the MSC 125 has obtained the data from the HLR 130 and authenticated the handset 105 based on the security key, the handset 105 is operable on the network 110. In this typical implementation, however, the activation process populates the HLR 130 and the authentication center 135 with data about the handset 105, including the identification number and shared secret. Hence, if the handset 105 has not been activated, neither the HLR 130 nor the authentication center 135 will contain records corresponding to the identification number of the handset 105, preventing the handset 105 from registering with the network 110 and thus rendering the handset 105 inoperable on the network 110. Moreover, this problem is somewhat circular, since, if the handset 105 cannot register with the network, there is no way for the handset 105 to perform any type of self-activation. As a result, activation generally must be performed using a vehicle independent of the handset 105 (such as an activation computer at the location of a dedicated wireless reseller, a voice call to an attendant at a call center, a web-based transaction from a separate computer, etc.).

Figure 2:
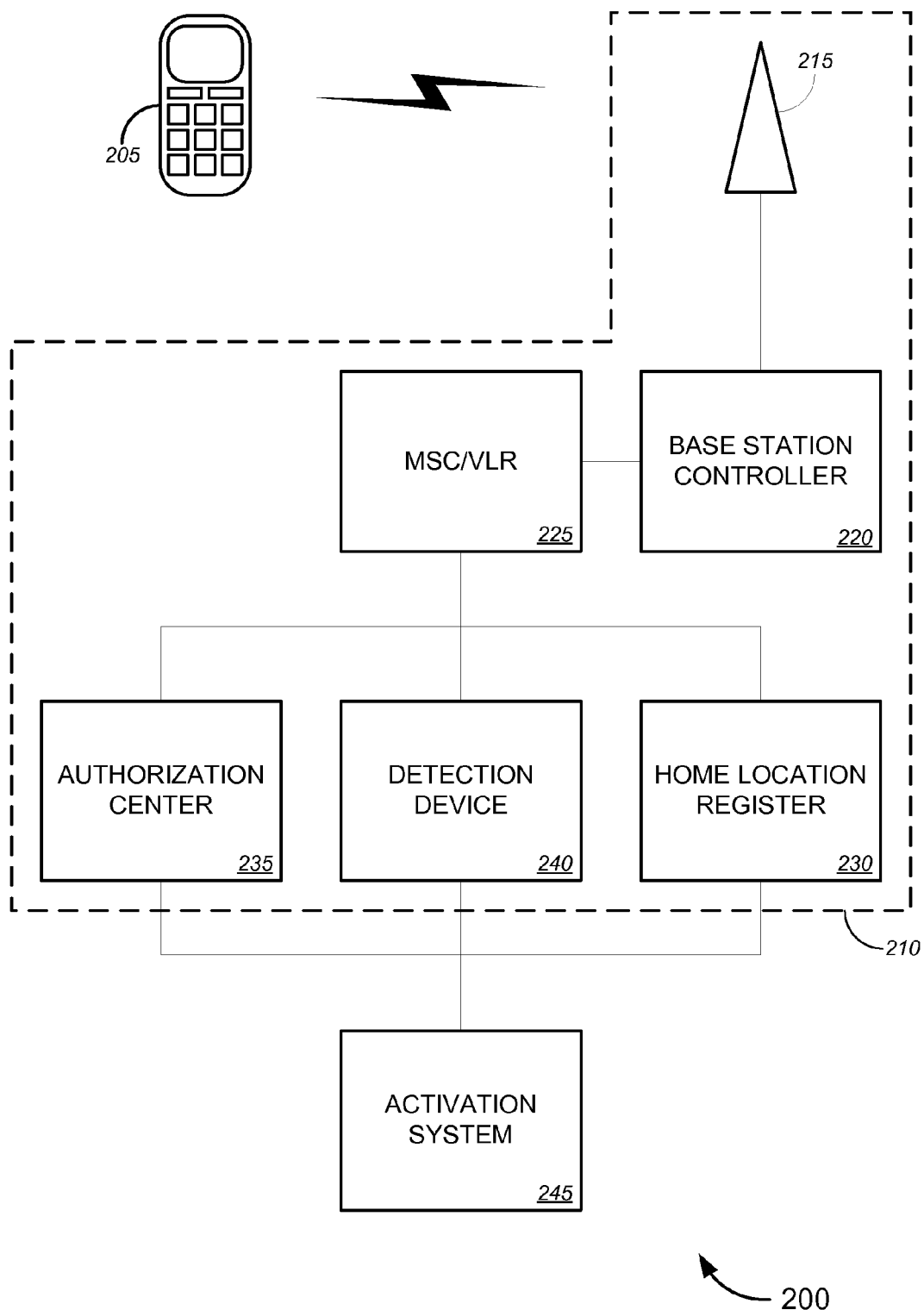
FIG. 2 is a block diagram illustrating an arrangement configured to activate a wireless device, in accordance with various embodiments of the invention.

FIG. 2 illustrates another arrangement 200 between a handset 205 and a wireless network 210, in accordance with embodiments of the invention. The arrangement 200 is similar to the arrangement 100 described above, and it operates in similar fashion once the handset 205 has been activated. The arrangement 200, however, is configured to allow the handset 205 to be the vehicle for its own activation. In accordance with a set of embodiments, in addition to the base station 215, base station controller 220, MSC/VLR 225, HLR 230 and authentication center 135, the arrangement includes a detection device 240 and an activation system 245. The detection device 240 can be any device and/or computer system that can be configured to perform the function ascribed herein to the detection device 240. In some cases, the detection device 240 may be implemented by a modified HLR; in other cases, the detection device 240 may be purpose-built from scratch. The activation system 245 can be any computer system and/or device that comprises the necessary configuration and/or software to perform the functions described below to activate the handset 205 though the network 210. In one embodiment, the activation system 245 is a single computer; in other embodiments, it may be a group of computers that collectively provide the functionality described herein.

In the illustrated embodiment, the detection device 240 resides within the network 210, while the activation system 245 is outside the network, although the activation system is in communication (either directly or indirectly) with the detection device 240, as well as the HLR 230, authentication center 235 and/or MSC 225. (In various other arrangements, the detection device 240 and/or the activation system 245 may be either inside or outside the network 210 and/or may be in communication, either through the network 210 or otherwise, with various components of the network.)

One mode of operation of the arrangement 200, and in particular the detection device and activation system 245, is described in detail below. In a general sense, however, a set of embodiments provides a detection device that is configured to act as a "quasi-HLR." In other words, the detection device (which is not a HLR 130 and generally does not perform the functions of an HLR 130), is configured to be seen by the network 210—and, in particular the MSC 225—as the HLR for an unactivated handset 205. Hence, when the unactivated handset 205 attempts to register with the network 210, the MSC 225 queries the detection device 240, rather than the HLR 230, for data about the handset 205. The detection device 240, in turn, contacts the activation system 245, which is responsible for assigning an addressing number to the handset 205 and, in some cases, assigning a new, permanent identification number to SIM in the handset 205 as well. (In which case, the original, temporary identification number can be reused on a different unactivated SIM in the future.) In an aspect, the activation system is also responsible for updating the network 210 to complete activation of the handset, as described in further detail below.

Figure 3:
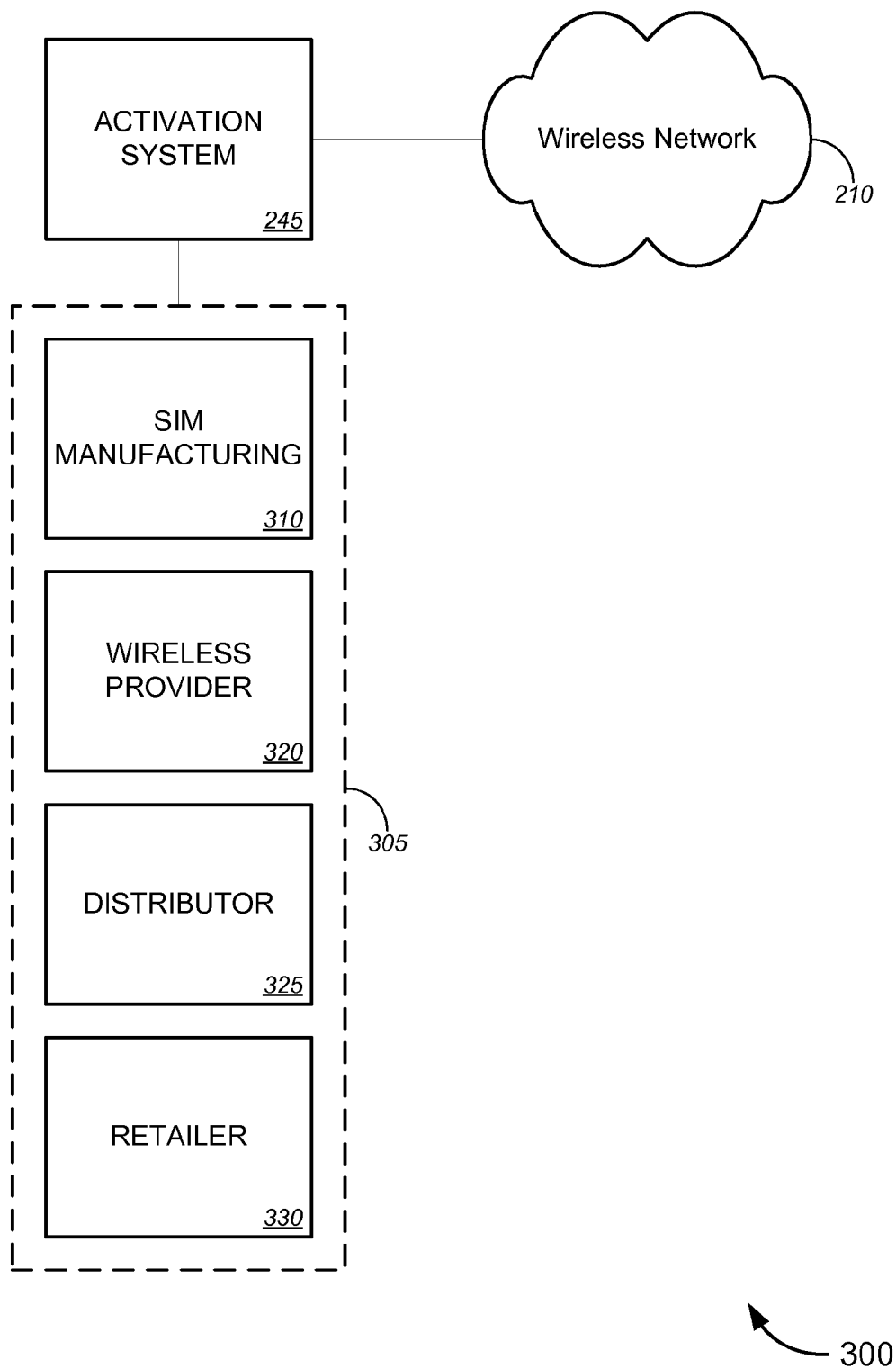
FIG. 3 is a block diagram illustrating a relationship between a device activation provider and a supply chain, in accordance with various embodiments of the invention.

In another set of embodiments, this activation technique forms the basis for a business process that can be used to manufacture and/or distribute SIMs more efficiently, and/or to monetize the number selection process. FIG. 3 illustrates a relationship 300 between the activation system 245 and a supply chain (which might also be considered a sales channel) 305. The supply chain 305 can involve any of a number of entities; as illustrated, the supply chain 305 includes a SIM manufacturing process 210, a wireless provider 320, a distributor 325, and a retailer 330. A retailer can be any of a variety of entities, with a variety of relationships to a wireless provider 320. For example, in some cases, the retailer 330 might be a value-added reseller of handsets, while in other cases, the retailer 330 might be a big-box electronic store. In some cases, the retailer might be a general merchandise retailer (such as a grocery store, convenience store, kiosk, etc.). Unlike some traditional activation techniques, embodiments of the invention can support retail sales through virtually any type of retailer.

In various embodiments, the supply chain 305 may contain none, one, or more of each of these types of entities. For example, in a case in which the activation system 245 is operated by the wireless provider (i.e., the wireless telephone company will provide service for the handset once activated), the wireless provider might not be considered part of the supply chain. As another example, if the handsets/SJMs are rebranded before sale to the end user, there might be multiple wireless providers 320 in the supply chain. (It should be noted as well that any two or more of these entities may be consolidated; for example, the wireless provider 320 may also act as the distributor 325 and/or retailer 330 of handsets.)

In the illustrated embodiment, the SIM manufacturing process 310 is at the beginning of the supply chain (although the activation provider might actually be considered the beginning of the supply chain). The SIM manufacturing process 310 is responsible for manufacturing SIMs and/or, more precisely, for encoding the SIMS with identification numbers provided by the activation system 245

The SIMs then can be provided to the wireless provider 320, which distributes them to distributors 325 (and/or directly to retailers 330), either installed in handsets or as standalone components to be installed later into handsets. A retailer 330, after receiving a SIM/handset, sells the handset to a user, who can then activate the handset as described herein.

As noted above, the activation system 245 (which might be operated by an activation provider, who may be a standalone entity and/or one of the other entities within the supply chain 305, such as the wireless provider 320 and/or SIM manufacturer) may be configured to be in communication with one or more other entities in the supply chain. In an aspect, the activation system 245 might be in communication with these entitie(s) through conventional computer communications (such as by way of a business application, such as a supply chain management application, via specialized software, via a specified data exchange format, such as XML, via human communication, etc.).

The activation system 245, in an aspect, interacts with the SIM manufacturing process to provide a pool of known identification numbers (e.g., IMSI numbers) that can be encoded onto SIMs as temporary identification numbers of unactivated SIMs. The SIM manufacturing process 310 can then produce SIMs, in conventional fashion, encoded with identification numbers from this pool.

The activation system 245 may also interact with the wireless provider (in addition to interacting with the provider's network to activate wireless devices, as described elsewhere herein) to provide status information about the activation process, for example, by notifying the provider 320 of the status of SIMs/identification numbers. The activation system 245 may interact as well with distributors 325 and/or retailers 330 to provide such information, to obtain information about sales of SIMs (and/or devices comprising the SIMs), particularly SIMs having temporary identification numbers.

The activation system 245 (and/or another computer in communication therewith) may track the progress of the SIM through the supply chain/sales channel, either to maintain information about the status of the IMSIs and to prevent supply chain leakage, and/or to identify an entity responsible for the IMSI. For example, if an IMSI is used in a rebranded wireless device, it can be useful to know the provider of the rebranded service, as there may be need to apportion fees and/or account for transaction costs associated with the sale of the wireless device. In one aspect, the activation system 245 (and/or an associated computer) may receive status updates when the status of an IMSI changes, including, for example, when a SIM is encoded with the IMSI, when the SIM is installed in a device, when the device is provided to a distributor 320 and/or retailer 330, when the device is purchased by an end user, etc. Such updates may be provided by the entity responsible for the status of the IMSI at that time and/or may be propagated up the supply chain to the activation system (or associated computer). Standard supply chain and/or sales channel management techniques, communications techniques, and/or software may be used to communicate such information.

In another aspect, the activation system 245 (and/or another aspect of the activation provider) may interact with entities in the supply chain to transfer payments in relation to the activation process. In some embodiments, for example, the activation provider may receive payment from a wireless provider 320 (and/or any of the other entities) for providing activation services. In other embodiments, the activation provider may also make payments to any of these entities, and/or may notify the entities of such payments, amounts owing, etc., via the activation system 245 and/or another system in communication therewith. Merely by way of example, as described below, in some cases, a user will be charged a fee for the ability to have input into the selection. That fee may be charged by the activation provider, and/or a portion of the fee may be allocated to the SIM manufacturer 310, the wireless provider 320, distributor(s) 325, and/or retailer(s) 330. Payment of these portions of the fees, and/or accounting therefore, may be performed by the activation system 245 (and/or another computer in communication therewith). In other cases, the fee may be charged by the wireless provider 320 (or another entity) directly, for example, by adding the fee to the user's invoice for wireless service. In such cases, the activation system 245 might notify that entity of the type of input (as described below, for example) provided by the user in selecting the number (e.g., MSISDN) for the handset, so that the wireless provider 320 (or other entity) can properly bill the user. Some of that fee might be allocated to the activation provider as well.

Figure 4:
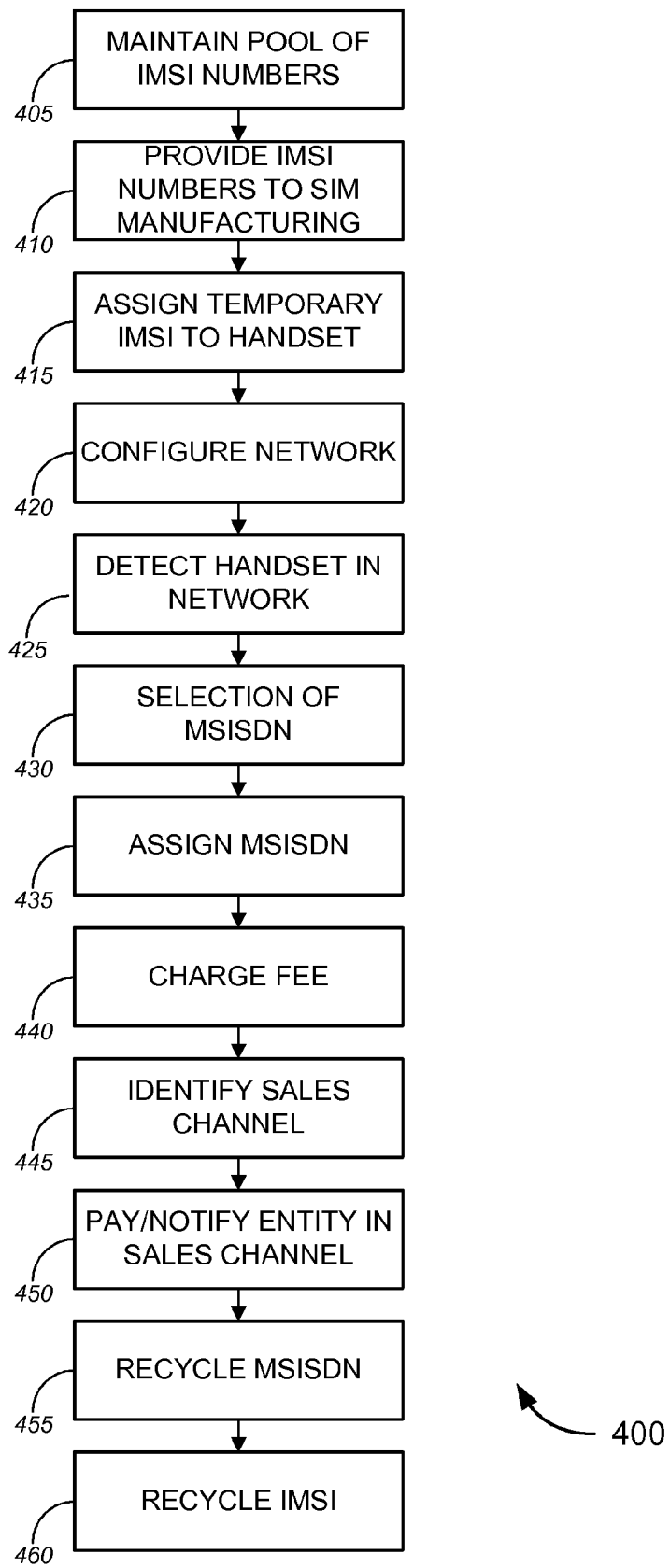
FIG. 4 is a process flow diagram illustrating a business process based on device activation, in accordance with various embodiments of the invention.

To illustrate some of these concepts, FIG. 4 illustrates a business method 400 based on device activation, in accordance with a set of embodiments. In accordance with the method 400, a pool of identification numbers (which is referred to in this discussion as an IMSI for ease of description, but might be any appropriate type of identification number) is maintained, for example, at the activation system (block 405). The pool might, but need not, comprise consecutively-numbered IMSIs. Each of the IMSIs in this pool is known to the activation system, and they are designated by the activation system for use as temporary IMSIs. (The activation system might also maintain another pool of IMSIs to be used as permanent IMSIs, as described in more detail below.) Maintaining a pool of IMSIs can comprise storing the IMSIs in a database accessible to the activation system, keeping a record of the IMSIs, removing used IMSIs from the pool, adding IMSIs to the pool when necessary, and/or the like.

The temporary IMSIs in the pool are provided to a SIM manufacturing process (block 410), which manufactures SIMs encoded with these temporary IMSIs and/or otherwise provides for each of the temporary IMSIs to be encoded and/or stored on a SIM. Each temporary IMSI is thereafter assigned to a handset (block 415), for example, by installing a SIM encoded with the IMSI into the handset and/or otherwise packaging the SIM with the handset. In an aspect, providing the IMSI to be encoded on a SIM, the activation system reserves this temporary IMSI from the pool of available IMSI numbers, so that it cannot be used again (at least until recycled, as described below).

At block 420, the network is configured to accommodate the activation process of the current invention. One method of configuring the wireless network is described in further detail below with respect to FIG. 5. At block 425, a handset comprising a SIM with one of the temporary IMSIs is detected by the network, for example, using the process described below with respect to FIG. 6.

An addressing number (which is referred to hereinbelow as an MSISDN, although other types of addressing numbers are possible as well in accordance with embodiments of the invention) optionally may be selected by the user (block 430), for example, using the procedures of FIG. 7, described below. This MSISDN is assigned to the handset (or, more precisely the SIM) (block 435), for example, by associating (in the HLR) the MSISDN with the IMSI assigned to the phone, as described further below. In some cases, also as described below, the MSISDN may be provided to the handset for the convenience of the user.

Optionally, the user may be charged a fee (block 440), for example, in relation to the activation itself process itself, based on the user's selection of an MSISDN, etc. In some cases, the activation system may be responsible for charging the user a fee, for example, by prompting the user for credit card information (via an interface on the wireless device, etc.) and charging the fee to the credit card identified by the user. In other cases, the fee may be charged by the wireless provider and/or another entity in the supply chain of the wireless device. In other cases, the user may be credited with an initial balance (for example, upon purchasing a SIM and/or wireless device), which may be debited to account for the fee charged to the user. (If the user elects to employ a selection technique that does not require a fee, the initial balance might be credited to the user's prepaid service, credited against a future invoice for service, refunded, etc.)

At block 445, notification is provided to one or more entities in the supply chain for the handset (and/or the SIM). This notification can comprise notification that the wireless device has been activated, notification of a type of selection of an MSISDN by the user, and/or the like. In an aspect, the activation system may be used to provide this notification, perhaps via an automated process that does not require user input. The activation system might notify the entities in the supply chain using, for example, any of the communication techniques described above with respect to FIG. 3. In cases where another entity in the supply chain is responsible for charging a fee to the user, this notification can serve as a trigger and/or basis for the fee. In cases in which the activation provider charges a fee, this notification might include a payment and/or accounting corresponding to a portion of the fee owed to various entities in the supply chain.

Beneficially, aspects of certain embodiments allow for the reuse of temporary MSISDNs and/or IMSIs. Hence, for example, if the handset is provided a temporary MSISDN during the activation process (as described below), that temporary MSISDN is reserved from a pool of available temporary MSISDNs during the activation process. After the process has been completed, and the handset is assigned a permanent MSISDN, the temporary MSISDN can be recycled (i.e., returned to the pool of available MSISDNs) (block 455), so that it is available for future activation procedures with other devices. In this way, the number of temporary MSISDNs needed for the activation processes of the invention can be minimized.

Similarly, once the activation system has confirmed that the handset has been activated, if the activation process includes assignment of a permanent IMSI to the handset (as described below, for example), the activation system can return the temporary IMSI assigned to the SIM in the handset to the pool of available temporary IMSIs, so that another SIM can be encoded with the same temporary IMSI, and the process can be repeated at a later time with another handset. Hence, the number of IMSIs that need to be maintained in the pool of temporary IMSIs can be minimized as well.

Figure 5:
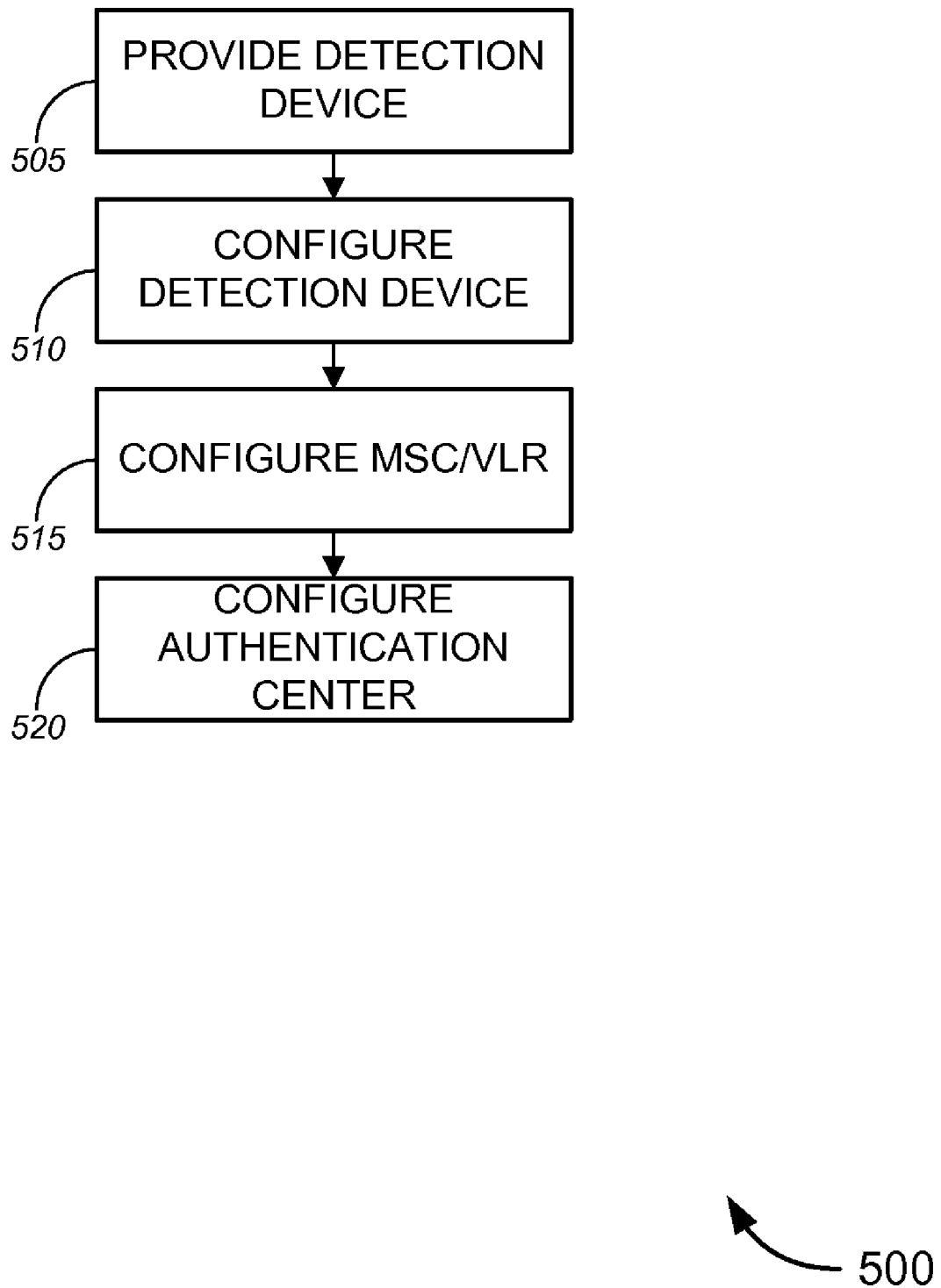
FIG. 5 is a process flow diagram illustrating a method of configuring a wireless network to support wireless device activation, in accordance with various embodiments of the invention.

FIG. 5 is a process flow diagram illustrating a method 500 of configuring a wireless network to support wireless device activation, in accordance with various embodiments of the invention. The method 500 can be implemented within the business method 400 described above and/or as a precursor to (and/or part of) the activation process described below with respect to FIG. 6.

The method 500 comprises providing a detection device (block 505). Providing a detection device might comprise installing the detection device in a wireless provider's network. The features of a detection device are described in general above, and specific functionality of one embodiment of a detection device is described in further detail below with respect to FIG. 6. Providing a detection device might also comprise configuring the detection device (block 510). Configuration of the detection device can include establishing communication between the detection device and other components in the wireless network, establishing communication between the detection device and the activation system, and/ or the like. In an aspect, configuring the detection device can also comprise storing in the detection device a pool of temporary MSISDNs that can be used for the activation process, and/or installing, on the detection device, code (e.g., hardware, firmware and/or software instructions) that implements the functionality described herein.

The method 500 may also comprise configuring specific components of the wireless network to operate in accordance with embodiments of the invention. Specifically, in some cases, an MSC and/or VLR (and/or any other necessary component within the wireless network) is configured to treat the detection device as the HLR for any IMSI that falls within the pool maintained by the activation system (block 515). Hence, when an unactivated handset (which is assigned a temporary IMSI) attempts to register with the network, the network will seek information about that handset from the detection device, as opposed to the conventional HLR (which, at that point will be unaware of the handset, since the handset has not been activated).

Configuration of the network can also include configuration of the authentication center (block 520). Configuration of the authentication center includes, in one aspect, populating the authentication center with security keys for wireless devices identified by the temporary IMSIs (that is, creating records in the authentication center that correlate temporary IMSIs with the shared secrets stored on the SIMs encoded with those temporary IMSIs; these shared secrets then can be used to generate the necessary security keys for the handsets, as described above). This process may be similar to the configuration of an authentication center under a traditional activation process, except that the temporary IMSI is used instead of a permanent IMSI).

These configuration operations, in an embodiment, can be performed automatically (and/or based on user input) by the activation system. In another embodiment, this configuration is performed manually.

Figure 6:
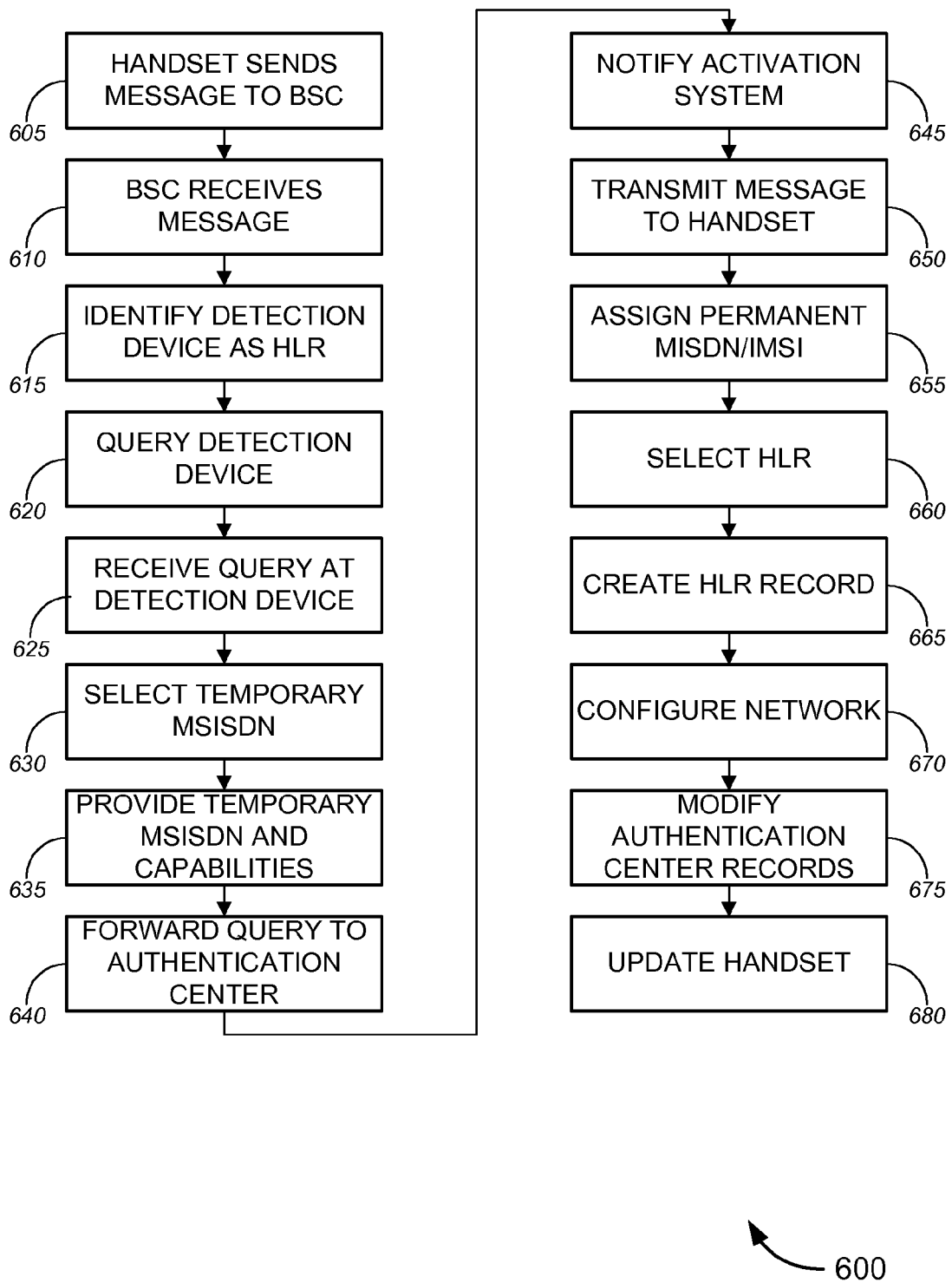
FIG. 6 is a process flow diagram illustrating a method of activating a wireless device on a wireless network, in accordance with various embodiments of the invention.

FIG. 6 is a process flow diagram illustrating a method 600 of activating a wireless device on a wireless network, in accordance with various embodiments of the invention. In one aspect, the method 600 may be performed using a wireless network that has been configured in accordance with the method 500. In another aspect, the method 600 may include the method 500.

In accordance with the method 600, an unactivated handset (i.e., a handset that has not been activated as a subscriber of the wireless provider and/or has not been activated as a subscriber on the wireless network) attempts to send a message (such as registration message, upon power up or upon entering the service area of the network) to the network (block 605). In an aspect, the message is sent to a base station controller (e.g., transmitted by the handset, received at a base station, and relayed to the base station controller) in somewhat conventional fashion. Upon receiving the message at the base station controller (block 610), the network (and/or, more specifically, in some case, an MSC and/or VLR) identifies IMSI of the handset from the message, in conventional fashion. Based on this identification of the IMSI, the network (and/or the MSCNVLR) identifies the detection device as a quasi-HLR for the handset (block 615). In other words, the network identifies the detection device as the HLR for the handset (the term "quasi-HLR" is used to indicate that, although the detection devices is recognized as an HLR by the network, it does not function as a conventional HLR, but instead functions in accordance with the invention). Notwithstanding the differences between the detection device and an HLR, the network can identify the detection device as an HLR in a manner similar to the conventional identification of a HLR for a handset, except that the network has been modified (e.g., by a configuration operation as described above) to identify the detection device, as opposed to a traditional HLR.

The network and/or one or more of its components (e.g., the MSC and/or VLR) then effectively treats the detection device as the HLR for the handset, querying the detection device for data pertaining to the handset (block 620), such as the MSISDN of the handset and/or the capabilities of the handset. The detection device, upon receiving the query (block 625), selects a temporary MSISDN for the handset (block 630), perhaps from a pool of temporary MSISDNS maintained by the detection device and/or based on receiving an MSISDN from the activation system, and provides this temporary MSISDN and a description of the capabilities of the handset to the component (e.g., MSC and/or VLR) that queried the detection device (block 635).

In particular, the detection device might provide a notification to the component that the handset is capable of sending and/or receiving certain types of messages (such as short messaging service ("SMS") messages, Unstructured Supplementary Service Data ("USSD") messages, etc.), but is not capable of placing or receiving voice calls or providing any other services. In this way, the handset can be given sufficient functionality to complete the activation process, but remain otherwise limited until the activation process has been completed.

The detection device then queries the authentication (or forwards the query from the querying component) to the authentication center (block 640), so that the authentication center can provide the security key for the handset (which may be generated as noted above). In an aspect, this procedure can be undertaken in similar fashion to the operation of an HLR when receiving such a query.

The detection device also notifies the activation system, using any suitable method of communication (which can vary, depending on the implementation of the invention, but might be SS7-formatted messages, IP messages, and/or the like) that the handset has been detected on the wireless network (block 645), so that the activation system can perform the procedures necessary to activate the handset for use on the network.

In some embodiments, the activation system transmits a message (e.g., an SMS message, USSD message, etc.) to the handset (block 650) as part of the activation process. The nature of the message can vary, depending on the options provided to the user for selecting an MSISDN. In some cases, the message might simply inform the user of the MSISDN assigned to the handset as part of the activation process. In other cases, the message might invite the user to begin a MSISDN selection process, one example of which is described below with respect to FIG. 7. Based either on such a selection process, or on assignment of a default MSISDN (which might be the next available MSISDN, etc.), the activation system assigns a permanent MSISDN to the handset (block 655).

In addition, in some embodiments, the activation system assigns a permanent IMSI to the handset (or, more specifically to the handset's SIM). By assigning a permanent IMSI to the handset, these embodiments can avoid having to reconfigure the network to treat the temporary IMSI as a permanent IMSI, and can allow for reuse, at a later time, of the temporary IMSI. (It is possible, however, that some embodiments might reconfigure the network to treat the temporary IMSI as a permanent IMSI, for example by defining a real HLR—instead of the detection device—as the HLR for the handset, rather than assigning a different permanent IMSI to the handset.

To effectuate the assignment of the permanent MSISDN and/or IMSI to the handset, an HLR for the handset generally will be updated with the relevant information. In some cases, the activation system (or another component) selects a HLR to be the HLR for the handset (based on the location of the base station and/or controller with which the handset is in communication, based on the region of the MSISDN selected by the user, based on the user's preferred home location, etc.) (block 660). In other cases, there may be a default HLR that needs to be updated.

The HLR, then, is configured and/or updated by creating, in the HLR, a record that comprises the permanent IMSI and MSISDN (block 665). This process may be performed in the manner in which such records are typically created, or a specialized process, perhaps implemented by the activation system. Techniques for adding/updating HLR records are known in the art, and any of such techniques may be used as appropriate.

In some cases, the HLR is configured after a permanent MSISDN and/or IMSI has been assigned to the handset (or, more properly, to the SIM card). In other cases, a limited pre-provisioning technique may be employed, in which the HLR is configured (e.g., using a batch process on an appropriate periodic basis, perhaps based on an estimate of the number of activations that will occur over the period) with a number of pre-provisioned, paired MSISDN/IMSI combinations that have not yet been assigned to a handset, and/or other components of the wireless network can be configured to recognize the association of the pre-provisioned IMSIs with the HLR. In particular embodiments, the HLR may be configured this way prior to initiation of the activation process of a handset (e.g., before the handset ever even attempts to register with the network and, correspondingly, before the detection device is ever queried by the network). When the handset is activated in such a scenario, the pool of MSISDNs from which the permanent MSISDN can be selected (using any of the techniques described elsewhere herein, for example) may be limited to the pre-provisioned MSISDNs, and the permanent IMSI will then be the IMSI that has been paired with the MSISDN during the pre-provisioning process.

Even though the pre-provisioning requires the consumption of some IMSI numbers and MSISDNs prior to their utilization in the network, the number of IMSI/MSISDN pairs that are pre-provisioned at any given time might still fall far short (by orders of magnitude, in some cases) of the number SIMs in the supply chain, such that a major proportion of the advantages provided by various embodiments may be realized, while reducing the time and network resources consumed by the activation process.

In such embodiments, the wireless handset, upon activation, may be configured (as described below, for example) with the pre-provisioned IMSI that is paired in the HLR with the pre-provisioned MSISDN that has been selected for the SIM/handset. In such embodiments, the activation process may be streamlined, by nature of the fact that the HLR(s) likely will not need to be updated as part of the activation process, and because other network components may not need to be configured at activation to recognize an HLR as the HLR for the permanent IMSI (as described below for example), since the pre-provisioning of the IMSI/MSISDN pairs will have provided for this step already; in general, fewer network components will require updating using this technique, so the time required for activation (and the impact of multiple simultaneous activations on the network) can be reduced. Of course, it should be appreciated that, even under this scenario, some network configuration (such as configuration of the authentication center, as described below) may still need to be performed at the time of activation.

In some cases, embodiments may employ schemes that use both limited pre-provisioning techniques and the configuration of the HLR during activation, depending on the circumstances of activation. Merely by way of example, the limited pre-provisioning technique may be used as a default, with a fail-over to configuration of the HLR during activation if the system exhausts the supply of pre-provisioned MSISDN/IMSI pairs. As another example, the limited pre-provisioning technique may be used, except when the user elects to use an enhanced number selection option (as described below, for example), in which case, the HLR might be configured upon activation, to provide the user with a broader set of MSISDNs from which to select. (In a particular aspect, for example, the user might be charged a first fee, or nothing at all, to select an MSISDN that has been preprovisioned, or to accept assignment by the system of a pre-provisioned MSISDN. On the other hand, the user may be charged a different, perhaps higher, fee for the privilege of selecting an MSISDN that has not been pre-provisioned.)

This limited pre-provisioning process can also be used to enable the efficiency gains provided by various embodiments to be realized in a postpaid environment. It will be appreciated that, in most postpaid scenarios, the user typically will be required to sign an agreement to pay for wireless service with a particular provider (or to provide other accounting information to allow the provider to bill the user for service), and upon signing the agreement or providing this information, the user is provided with a handset (or provides a handset), which is then allocated an MSISDN by the provider. (This typically happens at a wireless provider's retail location.) To facilitate this type of scenario while maintaining the efficiencies of various embodiments, the tools might employ a technique in which the provider notifies the activation system of the MSISDN allocated by the provider to the handset (or, more precisely in some cases, to the SIM card in the handset). Upon receiving this notification, the system can pre-provision this MSISDN (with a paired IMSI) on an HLR. Accordingly, the handset then may be activated (as described herein) with the IMSI that had been paired with the assigned MSISDN during the pre-provisioning.

If necessary, the wireless network may then be configured to recognize the selected HLR as the HLR for the handset (e.g., the permanent IMSI) (block 670), perhaps in a manner similar to that used in a traditional activation of a new handset. (As noted above, if IMSI/MSISDN pairs are pre-provisioned prior to activation, this configuration may be unnecessary at the time of activation.) In addition, as necessary, the authentication center is configured by modifying the records of the authentication center to associate the shared secret on the SIM with the permanent IMSI (block 675). In an aspect, this modification might comprise simply modifying the appropriate record to reference the permanent IMSI, while in another aspect, the record for the temporary IMSI might be deleted, and a new record created; the new record would comprise the permanent IMSI and the existing shared secret stored on the SIM.

The method 600 may also comprise updating the handset to reflect the permanent MSISDN and/or IMSI (block 680). In an aspect, this update is performed via an over-the-air update of the SIM via the wireless network. As used herein, the term "over-the-air update" is used broadly to refer both to a somewhat typical "OTA" provisioning technique that is known to those skilled in the art, as well as to any technique that provides information to the handset (perhaps in the form of a standard message) to allow and/or force the handset to update the IMSI on the SIM. Merely by way of example, in some embodiments, the handset is configured with a SIM toolkit that provides applications for updating information on the SIM. The over-the-air-update, then, might comprise transmission of a message (such as a SMS message, USSD message, and/or the like), which is received at the handset. Upon receipt, the message is processed by the SIM toolkit, which uses the information in the message (e.g., the permanent IMSI and/or MSISDN) to update the SIM/handset accordingly.

It should be noted that updating the handset typically will include updating the SIM to associate the SIM with the permanent IMSI, but that the permanent MSISDN may not need to be used to configure the handset to operate on the network (since the MSISDN is paired in the HLR, as noted above, with the IMSI, and the handset need only provide the IMSI to register with the network during normal operation). Nonetheless, the handset may be updated with the permanent MSISDN for the convenience of the user, for example, by updating the handset's phonebook to indicate that the permanent MSISDN is the "phone number" for that handset, by assigning a voicemail button to access voicemail for hat MSISDN, etc.

At this point, the handset has been activated and can be used on the network, in conventional fashion, and, if appropriate, the temporary IMSI and/or temporary MSISDN can be returned to their respective pools in due course, so that they can be reused.

Figure 7:
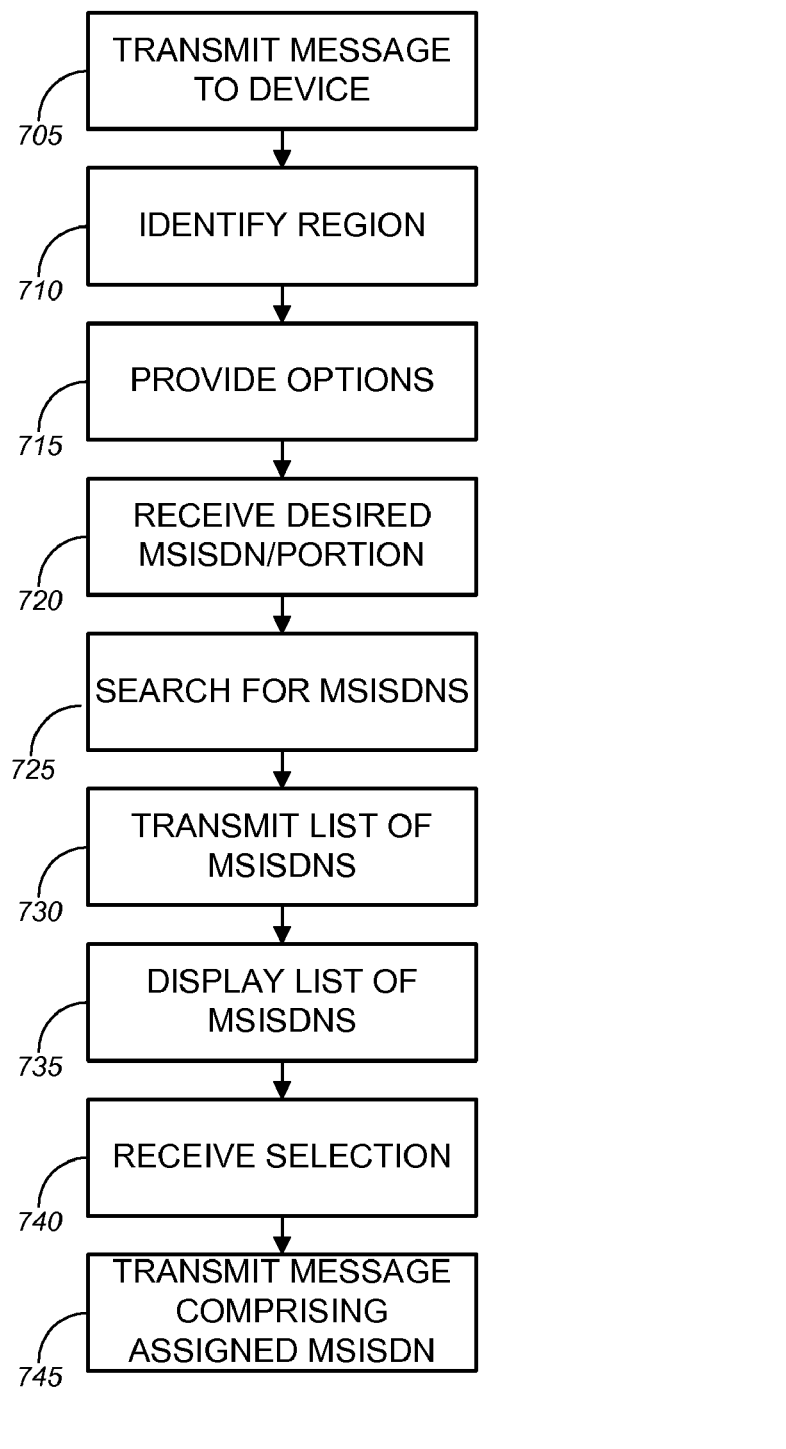
FIG. 7 is a process flow diagram illustrating a method of assigning, and/or allowing a user to select, a permanent addressing number for a wireless device, in accordance with various embodiments of the invention.

FIG. 7 is a process flow diagram illustrating a method 700 of assigning a permanent MSISDN to a handset and/or allowing a user to select a permanent MSISDN, in accordance with various embodiments of the invention. In one aspect, the method 700 can be incorporated into the method 600 described above, and in particular embodiments, into the MSISDN assignment procedures of that method.

The method 700 comprises sending a message (block 705), such as an SMS message and/or USSD message, for example, to the handset inviting the user to begin the MSISDN (number) selection process (see block 650, above). In some cases, the number selection process may be implemented by a series of SMS, USSD, etc. messages between the handset and the activation system (e.g., via the wireless network). Additionally and/or alternatively, the number selection process may be implemented as an application and/or applet (e.g., a Java applet) that is downloaded to the phone. Other techniques are possible as well.

In one aspect, the message provides the user with two or more options for selecting an MSISDN (block 710); these options can include, without limitation, accepting an assigned MSISDN, selecting a MSISDN from a specified list of available numbers, specifying a desired MSISDN (and/or portion—i.e., character string—thereof), selecting from among a list of "golden" (or premium) MSISDNs that are considered highly desirable, and/or the like. In an aspect, the message might also notify the user of respective charges (each of which might be a one-time charge or repeating charges) associated with each of the options. The charges, as indicated above, can vary according to which option is selected.

Depending, in some cases, on the option selected by the user and/or by the characteristics of the telephone system at the user's locale, it may be necessary to identify a home region for the handset (block 710), as the user's choice of region may affect the available MSISDNs. For example, in the United States, the user may desire a particular area code, which dictates the first three digits of the MSISDN to be used. Identification of a region can be based on a selection of region/regional code by the user, based on the user's current location (as indicated by GPS coordinates, by the location of the base station/controller in communication with the handset, etc.), based on the user's expressed home location, and/or the like.

Depending on the option specified by the user, the number selection process may vary. For example, if the user has elected to specify a desired portion of an MSISDN, the user is prompted to input the desired character string, and the string is transmitted from the handset and received by the activation system (block 720). The character string might be alphabetic and/or numeric—if some or all of the string is alphabetic, it can be translated by the activation system and/or an applet on the handset to a numeric string, based on the correlation of alphabetic and numeric characters on a common telephone keypad.

At block 725, the activation system searches an inventory of available MSISDNs for appropriate numbers. If the user has selected the option of specifying a desired portion of the MSISDN, the search is constrained to numbers matching the desired string, if available. Likewise, the search may be constrained to numbers having the correct regional code for the identified region (if specified). A list of one or more MSISDNs is prepared and transmitted to the handset (block 730). If the user simply elected to select from a list of available MSISDNs, the list might comprise the next group of available MSISDNs (subject to regional constraints), while if the user opted to specify a desired portion, the list might comprise available numbers that contain the desired string. If the user elected to select a premium number, the list might comprise one or more MSISDNs with desirable characteristics (e.g., easy to memorize, etc.). The handset, upon receiving the list, displays the list for the user (block 735) and provides an interface for the user to select an MSISDN from the list (again, perhaps via keypad input). Upon receiving the selected MSISDN (block 740), the activation system assigns the selected MSISDN to the handset (as detailed above).

Optionally, a message may be transmitted to the handset (block 745); the message, in an aspect, comprises the assigned MSISDN. If the user had elected to accept a default MSISDN, this message may simply inform the user of the assignment. If the user elected one of the other options, the message can serve to confirm the user's earlier selection of the MSISDN.

Figure 8:
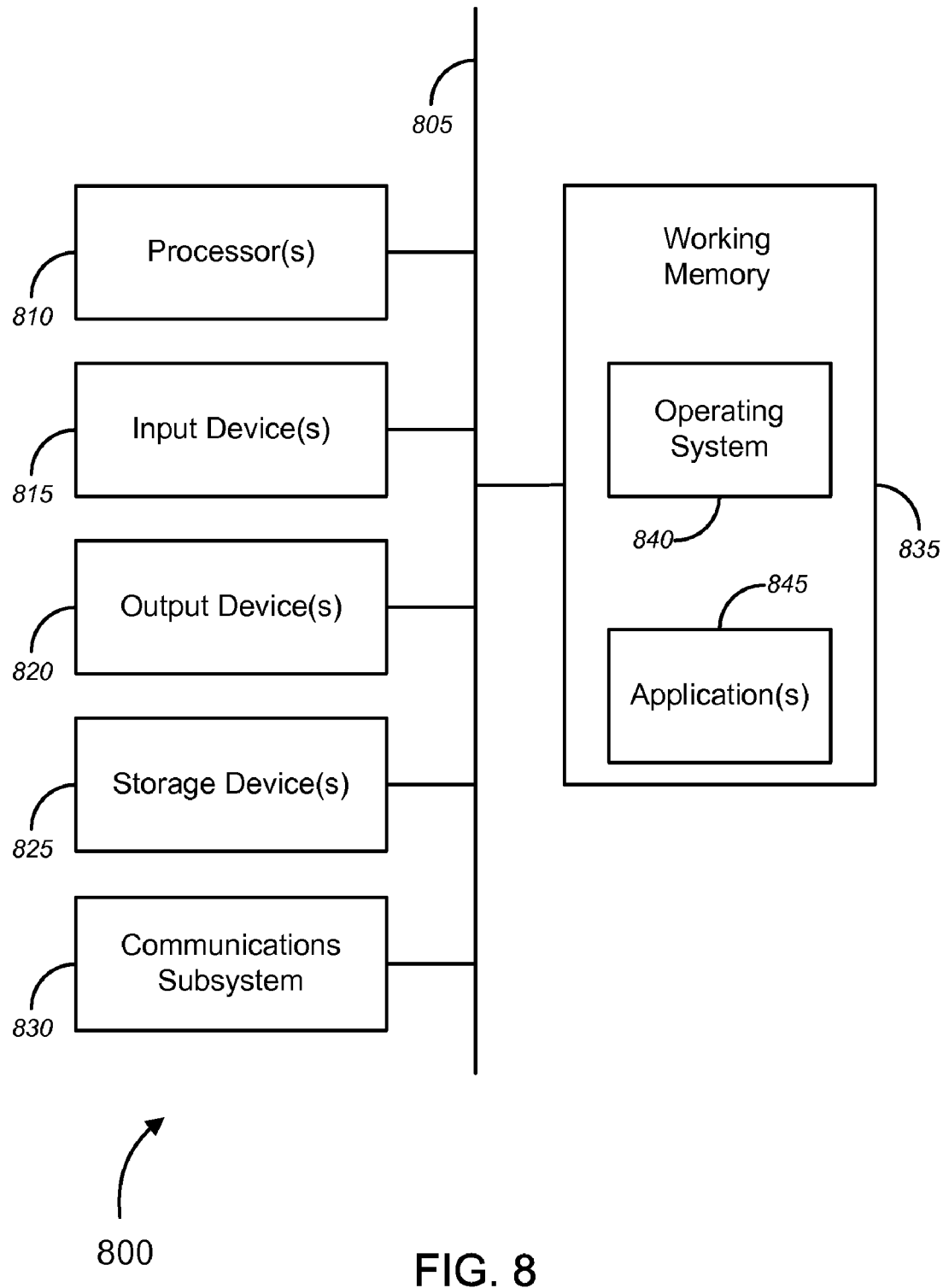
FIG. 8 is a generalized schematic diagram illustrating a computer system, in accordance with various embodiments of the invention.

FIG. 8 provides a schematic illustration of one embodiment of a computer system 800 that can perform the methods of the invention, as described herein, and/or can function as a detection device, an activation system, and/or one or more components of a wireless network. It should be noted that FIG. 8 is meant only to provide a generalized illustration of various components, any or all of which may be utilized as appropriate. FIG. 8, therefore, broadly illustrates how individual system elements may be implemented in a relatively separated or relatively more integrated manner.

The computer system 800 is shown comprising hardware elements that can be electrically coupled via a bus 805 (or may otherwise be in communication, as appropriate). The hardware elements can include one or more processors 810, including without limitation one or more general-purpose processors and/or one or more special-purpose processors (such as digital signal processing chips, graphics acceleration chips, and/or the like); one or more input devices 815, which can include without limitation a mouse, a keyboard and/or the like; and one or more output devices 820, which can include without limitation a display device, a printer and/or the like.

The computer system 800 may further include (and/or be in communication with) one or more storage devices 825, which can comprise, without limitation, local and/or network accessible storage and/or can include, without limitation, a disk drive, a drive array, an optical storage device, solid-state storage device such as a random access memory ("RAM") and/or a read-only memory ("ROM"), which can be programmable, flash-updateable and/or the like. The computer system 800 might also include a communications subsystem 830, which can include without limitation a modem, a network card (wireless or wired), an infra-red communication device, a wireless communication device and/or chipset (such as a Bluetooth™ device, an 802.11 device, a WiFi device, a WiMax device, cellular communication facilities, etc.), and/or the like. The communications subsystem 830 may permit data to be exchanged with a network (such as the network described below, to name one example), and/or any other devices described herein. In many embodiments, the computer system 800 will further comprise a working memory 835, which can include a RAM or ROM device, as described above.

The computer system 800 also can comprise software elements, shown as being currently located within the working memory 835, including an operating system 840 and/or other code, such as one or more application programs 845, which may comprise computer programs of the invention, and/or may be designed to implement methods of the invention and/or configure systems of the invention, as described herein. Merely by way of example, one or more procedures described with respect to the method(s) discussed above might be implemented as code and/or instructions executable by a computer (and/or a processor within a computer). A set of these instructions and/or code might be stored on a computer readable storage medium, such as the storage device(s) 825 described above. In some cases, the storage medium might be incorporated within a computer system, such as the system 800. In other embodiments, the storage medium might be separate from a computer system (i.e., a removable medium, such as a compact disc, etc.), and or provided in an installation package, such that the storage medium can be used to program a general purpose computer with the instructions/code stored thereon. These instructions might take the form of executable code, which is executable by the computer system 800 and/or might take the form of source and/or installable code, which, upon compilation and/or installation on the computer system 800 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

In one aspect, the invention employs a computer system (such as the computer system 800) to perform methods of the invention. According to a set of embodiments, some or all of the procedures of such methods are performed by the computer system 800 in response to processor 810 executing one or more sequences of one or more instructions (which might be incorporated into the operating system 840 and/or other code, such as an application program 845) contained in the working memory 835. Such instructions may be read into the working memory 835 from another machine-readable medium, such as one or more of the storage device(s) 825. Merely by way of example, execution of the sequences of instructions contained in the working memory 835 might cause the processor(s) 810 to perform one or more procedures of the methods described herein.

The terms "machine readable medium" and "computer readable medium," as used herein, refer to any medium that participates in providing data that causes a machine to operation in a specific fashion. In an embodiment implemented using the computer system 800, various machine-readable media might be involved in providing instructions/code to processor(s) 810 for execution and/or might be used to store and/or carry such instructions/code (e.g., as signals). In many implementations, a computer readable medium is a physical and/or tangible storage medium. Such a medium may take many forms, including but not limited to, non-volatile media, volatile media, and transmission media. Non-volatile media includes, for example, optical or magnetic disks, such as the storage device(s) 825. Volatile media includes, without limitation dynamic memory, such as the working memory 835. Transmission media includes coaxial cables, copper wire and fiber optics, including the wires that comprise the bus 805, as well as the various components of the communication subsystem 830 (and/or the media by which the communications subsystem 830 provides communication with other devices). Hence, transmission media can also take the form of waves (including without limitation radio, acoustic and/or light waves, such as those generated during radio-wave and infrared data communications).

Common forms of physical and/or tangible computer readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of machine-readable media may be involved in carrying one or more sequences of one or more instructions to the processor(s) 810 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 800. These signals, which might be in the form of electromagnetic signals, acoustic signals, optical signals and/or the like, are all examples of carrier waves on which instructions can be encoded, in accordance with various embodiments of the invention.

The communications subsystem 830 (and/or components thereof) generally will receive the signals, and the bus 805 then might carry the signals (and/or the data, instructions, etc. carried by the signals) to the working memory 835, from which the processor(s) 805 retrieves and executes the instructions. The instructions received by the working memory 835 may optionally be stored on a storage device 825 either before or after execution by the processor(s) 810.

Figure 9:
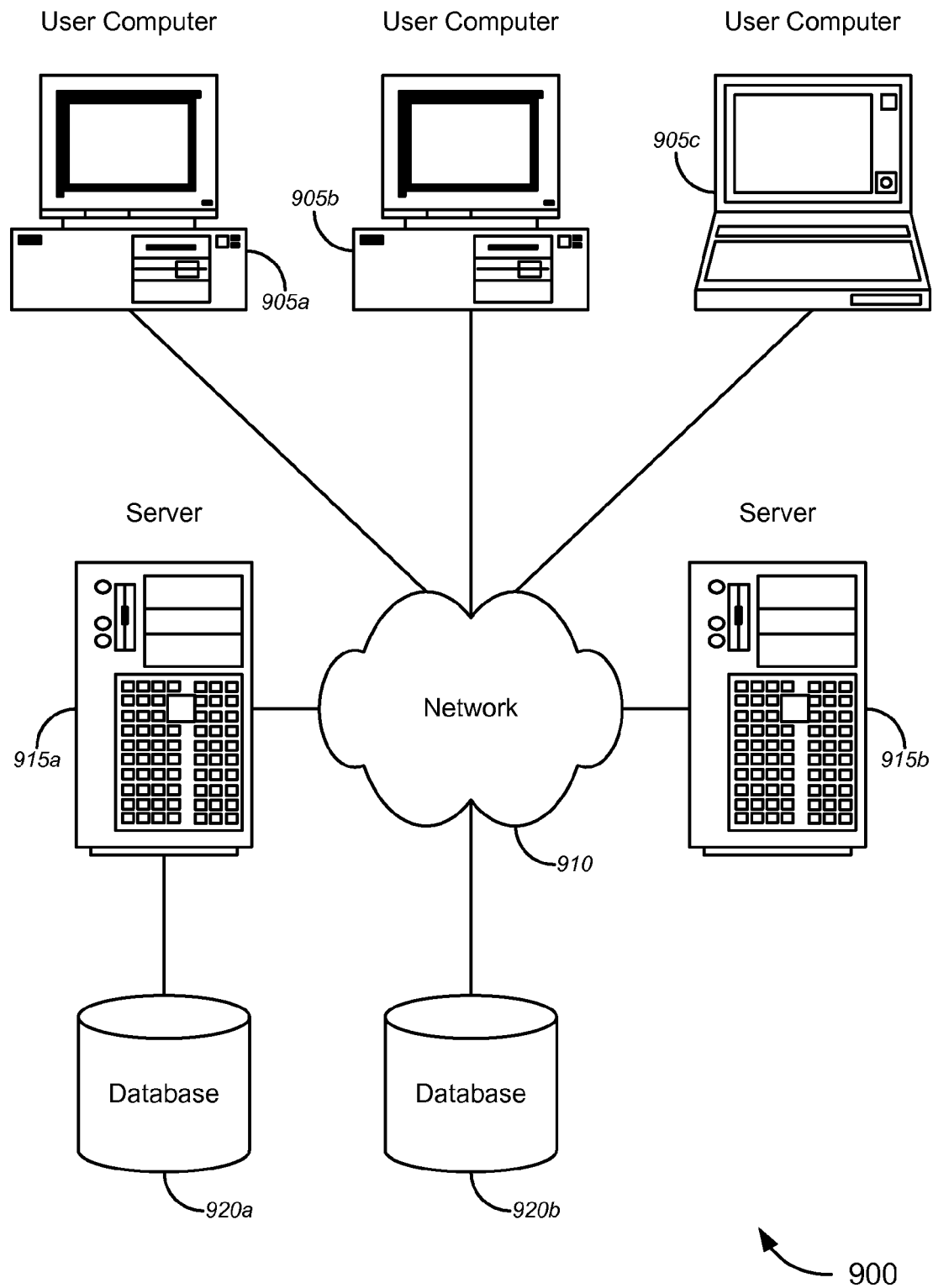
FIG. 9 is a block diagram illustrating a networked system of computers, which can be used in accordance with various embodiments of the invention.

As indicated above, a set of embodiments comprises systems for activating wireless devices and/or implementing business processes based on the activation of such devices. Merely by way of example, FIG. 9 illustrates a schematic diagram of a system 900 that can be used in accordance with one set of embodiments. The system 900 can include one or more user computers 905. The user computers 905 can be general purpose personal computers (including, merely by way of example, personal computers and/or laptop computers running any appropriate flavor of Microsoft Corp.'s Windows™ and/or Apple Corp.'s Macintosh™ operating systems) and/or workstation computers running any of a variety of commercially-available UNIX™ or UNIX-like operating systems. These user computers 905 can also have any of a variety of applications, including one or more applications configured to perform methods of the invention, as well as one or more office applications, database client and/or server applications, and web browser applications. Alternatively, the user computers 905 can be any other electronic device, such as a thin-client computer, Internet-enabled mobile telephone, and/or personal digital assistant, capable of communicating via a network (e.g., the network 910 described below) and/or displaying and navigating web pages or other types of electronic documents. Although the exemplary system 900 is shown with three user computers 905, any number of user computers can be supported.

Certain embodiments of the invention operate in a networked environment, which can include a network 910. The network 910 can be any type of network familiar to those skilled in the art that can support data communications using any of a variety of commercially-available protocols, including without limitation TCP/IP, SNA, IPX, AppleTalk, and the like. Merely by way of example, the network 910 can be a local area network ("LAN"), including without limitation an Ethernet network, a Token-Ring network and/or the like; a wide-area network; a virtual network, including without limitation a virtual private network ("VPN"); the Internet; an intranet; an extranet; a wireless network (as described above), a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments of the invention can include one or more server computers 915. Each of the server computers 915 may be configured with an operating system, including without limitation any of those discussed above, as well as any commercially (or freely) available server operating systems. Each of the servers 915 may also be running one or more applications, which can be configured to provide services to one or more clients 905 and/or other servers 915. In an aspect, an activation system may comprise one or more server computers 915, each of which might implement various portions of the functionality described above.

The server computers 915, in some embodiments, might include one or more application servers, which can include one or more applications (such as an activation application comprising instructions to perform operations in accordance with the handset activation methods described above, business applications, including supply chain management applications, etc.) accessible by a client running on one or more of the client computers 905 and/or other servers 915. Merely by way of example, the server(s) 915 can be one or more general purpose computers capable of executing programs or scripts in response to the user computers 905 and/or other servers 915, including without limitation web applications (which might, in some cases, be configured to perform methods of the invention). Merely by way of example, a web application can be implemented as one or more scripts or programs written in any suitable programming language, such as Java™, C, C#™ or C++, and/or any scripting language, such as Perl, Python, or TCL, as well as combinations of any programming/scripting languages. The application server(s) can also include database servers, including without limitation those commercially available from Oracle, Microsoft, Sybase™, IBM™ and the like, which can process requests from clients (including, depending on the configuration, database clients, API clients, web browsers, etc.) running on a user computer 905 and/or another server 915. In some embodiments, an application server can create web pages dynamically for displaying the information in accordance with embodiments of the invention, such as web pages for allowing an operator of an entity in a supply chain to view data related to the activation process, web pages transmitted to a handset during the activation process, and/or the like. Data provided by an application server may be formatted as web pages (comprising HTML, Javascript, etc., for example) and/or may be forwarded to a user computer 905 via a web server (as described above, for example). Similarly, a web server might receive web page requests and/or input data from a user computer 905 and/or forward the web page requests and/or input data to an application server. In some cases a web server may be integrated with an application server.

In accordance with further embodiments, one or more servers 915 can function as a file server and/or can include one or more of the files (e.g., application code, data files, etc.) necessary to implement methods of the invention incorporated by an application running on a user computer 905 and/or another server 915. Alternatively, as those skilled in the art will appreciate, a file server can include all necessary files, allowing such an application to be invoked remotely by a user computer 905 and/or server 915. It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 920. The location of the database(s) 920 is discretionary: merely by way of example, a database 920a might reside on a storage medium local to (and/or resident in) a server 915a (and/or a user computer 905). Alternatively, a database 920b can be remote from any or all of the computers 905, 915, so long as it can be in communication (e.g., via the network 910) with one or more of these. In a particular set of embodiments, a database 920 can reside in a storage-area network ("SAN") familiar to those skilled in the art. (Likewise, any necessary files for performing the functions attributed to the computers 905, 915 can be stored locally on the respective computer and/or remotely, as appropriate.) In one set of embodiments, the database 935 can be a relational database, such as an Oracle database, that is adapted to store, update, and retrieve data in response to SQL-formatted commands. The database might be controlled and/or maintained by a database server, as described above, for example.

While the invention has been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware and/or software configuration. Similarly, while various functionality is ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with-or without-certain features for ease of description and to illustrate exemplary features, the various components and/or features described herein with respect to a particular embodiment can be substituted, added and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A method of activating a wireless device on a wireless network, the method comprising:
   maintaining, at an activation system, a pool of temporary international mobile station identity ("IMSI") numbers;
   assigning an IMSI number to the wireless device, wherein the temporary IMSI number falls within a pool of known IMSI numbers, and wherein the wireless device is not activated as a subscriber on the wireless network;
   populating an authentication center in the wireless network with a data for generating a security key for the wireless device;
   reserving the temporary IMSI number from the pool of known IMSI numbers;
   providing, in the wireless network, a detection device configured to identify the wireless device;
   configuring the wireless network to identify the detection device as a quasi-home location register for the block of known IMSI numbers;
   receiving, at a base station controller, a message from the wireless device, wherein the message comprises the first IMSI number;
   identifying the temporary IMSI number of the wireless device;
   based on the identification of the temporary IMSI number, identifying the detection device as a quasi-home location register for the wireless device;
   receiving, at the detection device, a query from a mobile switching center ("MSC") for data pertaining to the wireless device;
   selecting, from a pool of temporary mobile subscriber international ISDN numbers ("MSISDN") maintained by the activation system, a temporary MSISDN for the wireless device;
   providing to the MSC, in response to the query, the temporary MSISDN assigned to the wireless device and a notification that the wireless device is capable of receiving short messaging service ("SMS") messages;
   forwarding the query from the detection device to the authentication center, so that the authentication center can provide to the MSC the security key for the wireless device;
   notifying the activation system that the wireless device has been detected;
   transmitting a SMS message from the activation system to the wireless device, the message comprising instructions for registering the wireless device with the wireless network;
   assigning, at the activation system, a permanent MSISDN to the wireless device, based on an interaction, via the wireless device, between the user and the activation system;
   assigning, at the activation system, a permanent IMSI number to the wireless device;
   updating the wireless device with the permanent IMSI number, via an over-the-air provisioning message;
   creating, in a home location register, a record corresponding to the wireless device, the record comprising the permanent MSISDN and the permanent IMSI number;
   configuring the wireless network to identify the home location register as the home location register for the wireless device;
   creating, in the authentication center, a new entry to correlate the security key assigned to the wireless device with the permanent IMSI number assigned to the device;
   returning the temporary MSISDN to the pool of temporary MSISDNs, such that the temporary MSISDN can be selected for another wireless device; and
   returning the temporary IMSI to the pool of known IMSI numbers, such that the temporary IMSI number can be assigned to another wireless device.

2. A method of activating a wireless device on a wireless network, the method comprising:
   assigning a first identification number to an identification module, wherein the identification number falls within a pool of known identification numbers, and wherein the identification module is not activated as a subscriber on the wireless network;
   providing, in the wireless network, a detection device configured to identify the wireless device associated with the identification module;
   configuring the wireless network to identify the detection device as a quasi-home location register for the block of known identification numbers;

receiving, at the detection device, a query, from a component of the wireless network, for data pertaining to the wireless device;

assigning, at the detection device, a temporary addressing number to the wireless device;

in response to the query, providing to the component of the wireless network the temporary addressing number;

notifying an activation system that the wireless device has been detected;

assigning, at the activation system, a permanent addressing number to the wireless device; and creating a record in a home location register corresponding to the wireless device, wherein the record comprises the permanent addressing number.

3. A method of activating a wireless device on a wireless network, the method comprising:

assigning a first identification number to an identification module, wherein the identification number falls within a pool of known identification numbers, and wherein the identification module is not activated as a subscriber on the wireless network;

providing, in the wireless network, a detection device configured to identify a wireless device associated with the identification module;

configuring the wireless network to identify the detection device as a quasi-home location register for the block of known identification numbers;

receiving, at the detection device, a query, from a component of the wireless network, for data pertaining to the wireless device;

assigning, at the detection device, a temporary addressing number to the wireless device;

in response to the query, providing to the component of the wireless network the temporary addressing number;

notifying an activation system that the wireless device has been detected;

assigning, at the activation system, a permanent addressing number to the wireless device; and creating a record in a home location register corresponding to the wireless device, wherein the record comprises the permanent addressing number.

4. The method of claim 3, further comprising:

populating an authentication center in the wireless network with data for generating a security key for the wireless device; and forwarding the query from the detection device to the authentication center, so that the authentication center can provide, to the component of the wireless network, the security key for to the wireless device.

5. The method of claim 3, wherein the identification number is an international mobile subscriber identity ("IMSI") number.

6. The method of claim 3, wherein assigning a first identification number to the identification module comprises assigning the first identification number to a subscriber identity module ("SIM") card and packaging the SIM card with the wireless device.

7. The method of claim 3, further comprising:

receiving, at a base station controller, a message from the wireless device, wherein the message comprises the first identification number;

identifying the first identification number, based on the message from the wireless device; and based on an identification of the first identification number, querying the detection device for data pertaining to the wireless device.

8. The method of claim 7, further comprising:

selecting the home location register based on a location of the base station controller receiving the message from the wireless phone.

9. The method of claim 8, further comprising:

maintaining a pool of available addressing numbers at the selected home location register;

wherein the permanent addressing number assigned to the wireless device is selected from the pool of available addressing numbers.

10. The method of claim 3, wherein the record is created in the home location register prior to receiving, at the detection device, the query for data pertaining to the wireless device.

11. The method of claim 3, further comprising:

pre-provisioning the home location register with a plurality of paired combinations of addressing numbers and identification numbers; and assigning a permanent identification number to the wireless device;

wherein assigning a permanent addressing number to the wireless device comprises assigning one of the pre-provisioned addressing numbers to the wireless device, and assigning a permanent identification number to the wireless device comprises assigning to the wireless device an identification number that has been paired with the assigned addressing number.

12. The method of claim 3, wherein assigning a permanent addressing number to the wireless device comprises:

receiving notification that a particular permanent addressing number has been allocated by a wireless service provider to the wireless device;

pre-provisioning the home location register with a paired combination of the particular addressing number and a permanent identification number; and assigning the particular permanent addressing number to the wireless device.

13. The method of claim 3, wherein assigning a temporary addressing number to the wireless device comprises selecting, from a pool of available temporary addressing numbers, the temporary addressing number.

14. The method of claim 13, further comprising, upon assigning the permanent addressing number to the wireless device, returning the temporary addressing number to the pool of available temporary addressing numbers.

15. The method of claim 3, wherein the first identification number is a temporary identification number, the method further comprising:

assigning a permanent identification number to the wireless device.

16. The method of claim 15, further comprising:

updating the wireless device with the permanent identification number, via an over-the-air provisioning message.

17. The method of claim 15, wherein the record in the home location register further comprises the permanent identification number.

18. The method of claim 15, wherein the pool of known identification numbers comprises a pool of available of temporary identification numbers, wherein assigning the temporary identification number to the wireless device comprises reserving the first identification number from the pool of available temporary identification numbers.

19. The method of claim 18, further comprising:

after assigning the permanent identification number to the wireless device, returning the temporary identification number to the pool of available temporary identification numbers.

20. The method of claim 3, wherein the wireless device is selected from the group consisting of a global system for mobile communications ("GSM") telephone and a code division multiple access ("CDMA") phone.

21. The method of claim 3, wherein the wireless device is a prepaid wireless phone.

22. The method of claim 21, wherein the prepaid wireless phone was purchased by a user from a general merchandise retailer.

23. The method of claim 3, further comprising:
notifying the component of the wireless network that wireless device to which the temporary addressing number is assigned is capable of receiving messages of a specified type.

24. The method of claim 23, wherein the specified type of message is selected from the group consisting of: a short messaging service ("SMS") type of message and a Unstructured Supplementary Service Data ("USSD") type of message.

25. The method of claim 3, wherein assigning the permanent addressing number to the wireless device comprises sending a message from the activation system to the wireless device.

26. The method of claim 25, wherein the message is a short messaging service ("SMS") message.

27. The method of claim 25, wherein the message comprises information about the permanent addressing number assigned to the wireless device.

28. The method of claim 25, wherein the permanent addressing number is assigned based on a location of the base station controller receiving the message from the wireless device.

29. The method of claim 25, wherein the permanent addressing number is assigned based on input from the user.

30. The method of claim 29, wherein the input from the user indicates a desired region for the permanent addressing number.

31. The method of claim 29, further comprising:
applying a charge to an account associated with the wireless device, as a result of assigning the permanent addressing number based on input from the user.

32. The method of claim 31, wherein an amount of the charge applied to the account is based on a type of input received from the user.

33. A method of activating a wireless device on a wireless network, the method comprising:
assigning a first identification number to the wireless device, wherein the identification number falls within a pool of known identification numbers, and wherein the wireless device is not activated as a subscriber on the wireless network;
providing, in the wireless network, a detection device configured to identify the wireless device;
configuring the wireless network to identify the detection device as a quasi-home location register for the block of known identification numbers;
receiving, at the detection device, a query, from a component of the wireless network, for data pertaining to the wireless device;
assigning, at the detection device, a temporary addressing number to the wireless device;
in response to the query, providing to the component of the wireless network the temporary addressing number;
notifying an activation system that the wireless device has been detected;
assigning, at the activation system, a permanent addressing number to the wireless device;
creating a record in a home location register corresponding to the wireless device, wherein the record comprises the permanent addressing number; and
applying a charge to an account associated with the wireless device, as a result of assigning the permanent addressing number based on input from the user;
wherein:
assigning the permanent addressing number to the wireless device comprises sending a message from the activation system to the wireless device;
the permanent addressing number is assigned based on input from the user;
an amount of the charge applied to the account is based on a type of input received from the user; and
if the user selects a permanent addressing number from a provided list of addressing numbers, the charge has a first amount, if the user requests a permanent addressing number matching at least a desired portion of a desired addressing numbers, the charge has a second amount, and/or if the user selects a premium addressing number, the charge has a third amount.

34. The method of claim 31, wherein applying a charge to an account associated with the wireless device comprises applying a repeating charge on a periodic basis.

35. The method of claim 25, wherein the message comprises a plurality of permanent addressing numbers from which a user of the wireless device can select the permanent addressing number, and wherein assigning the permanent addressing number to the wireless device further comprises receiving a selection of the permanent addressing number from the user.

36. The method of claim 25, wherein the message comprises an offer to allow a user to specify at least a desired portion of a desired addressing number, and wherein assigning a permanent addressing number to the wireless device further comprises searching for a permanent addressing number comprising at least the desired portion of the desired addressing number.

37. A system for activating a wireless device, the system comprising:
an activation system comprising a processor and a first computer readable medium, the first computer readable medium having encoded thereon a first set of instructions executable by the first activation system to perform one or more operations, the first set of instructions comprising:
instructions for maintaining a pool of known identification numbers for wireless devices; and
instructions for providing a temporary identification number for use in a wireless device, wherein the first identification number falls within the pool of known identification numbers; and
a detection device in a wireless network, the detection device comprising a second processor and a second computer readable medium having encoded thereon a second set of instructions executable by the detection device to perform one or more operations, the second set of instructions comprising:
instructions for receiving, from a component of the wireless network, a query for data pertaining to the wireless device, wherein the wireless device is not a subscriber on the wireless network;
instructions for assigning a temporary addressing number to the wireless device;
instructions for providing, to the component of the wireless network, the temporary addressing number, in response to the query; and instructions for notifying the activation system that the mobile device has been detected;

wherein the first set of instructions further comprises:

instructions to assign a permanent addressing number to the wireless device; and instructions to create, in a home location register, a record corresponding to the wireless device, wherein the record comprises the permanent addressing number.

38. An apparatus, comprising:

a first computer readable medium having encoded thereon a first set of instructions executable by an activation system to perform one or more operations, the first set of instructions comprising:

instructions for maintaining a pool of known identification numbers for wireless devices; and instructions for providing a temporary identification number for use in a wireless device, wherein the first identification number falls within the pool of known identification numbers; and a second computer readable medium having encoded thereon a second set of instructions executable by a detection device in a wireless network to perform one or more operations, the second set of instructions comprising:

instructions for receiving, from a component of the wireless network, a query for data pertaining to the wireless device, wherein the wireless device is not a subscriber on the wireless network;

instructions for assigning a temporary addressing number to the wireless device;

instructions for providing, to the component of the wireless network, the temporary addressing number, in response to the query; and instructions for notifying the activation system that the mobile device has been detected;

wherein the first set of instructions further comprises:

instructions to assign a permanent addressing number to the wireless device; and instructions to create, in a home location register, a record corresponding to the wireless device, wherein the record comprises the permanent addressing number.

39. The method of claim 3, wherein the component of the wireless network is a mobile switching center ("MSC"), a visited location register ("VLR"), or a combined MSC/VLR.

40. The method of claim 3, wherein the identification module is a subscriber identity module ("SIM") card.

\* \* \* \* \*